US011603086B2

(12) United States Patent
Oza et al.

(10) Patent No.: US 11,603,086 B2
(45) Date of Patent: Mar. 14, 2023

(54) APPARATUS AND METHOD FOR DETERMINING AIRCRAFT BRAKE FUTURE USE CYCLES

(71) Applicants: Airbus Operations Limited, Bristol (GB); Airbus Opérations (S.A.S.), Toulouse (FR); Airbus (S.A.S.), Blagnac (FR)

(72) Inventors: Utsav Oza, Bristol (GB); Andrew Bill, Bristol (GB); Kurt Bruggemann, Bristol (GB); Rodrigo Jimenez, Bristol (GB); Brice Cheray, Bristol (GB); Maud Consola, Bristol (GB)

(73) Assignees: AIRBUS OPERATIONS LIMITED, Bristol (GB); AIRBUS OPERATIONS (SAS), Toulouse (FR); AIRBUS (SAS), Blagnac (FR)

( * ) Notice: Subject to any disclaimer, the term of this patent is extended or adjusted under 35 U.S.C. 154(b) by 576 days.

(21) Appl. No.: 16/286,341

(22) Filed: Feb. 26, 2019

(65) Prior Publication Data

US 2019/0263375 A1     Aug. 29, 2019

(30) Foreign Application Priority Data

Feb. 27, 2018  (GB) ...................................... 1803203
Oct. 29, 2018  (GB) ...................................... 1817600

(51) Int. Cl.
*B60T 17/22*     (2006.01)
*B64F 5/60*      (2017.01)
(Continued)

(52) U.S. Cl.
CPC ............ *B60T 17/221* (2013.01); *B60T 8/171* (2013.01); *B60T 8/1703* (2013.01); *B60T 8/32* (2013.01);
(Continued)

(58) Field of Classification Search
None
See application file for complete search history.

(56) References Cited

U.S. PATENT DOCUMENTS 5,217,282 A   6/1993   Guichard
5,390,990 A   2/1995   Cook et al.
(Continued)

FOREIGN PATENT DOCUMENTS

EP      0329373       8/1989
EP      0384071       8/1990
(Continued)

OTHER PUBLICATIONS

Bacos, M.P. et al., "C/C Composite Oxidation Model-I. Morphological Experimental Investigations", Carbon, vol. 38, pp. 77-92 (2000).

(Continued)

*Primary Examiner* — James J Lee
*Assistant Examiner* — Andrew Sang Kim
(74) *Attorney, Agent, or Firm* — Nixon & Vanderhye P.C.

(57) ABSTRACT

An apparatus for an aircraft having one or more aircraft wheel brakes, and a brake wear sensor configured to measure a wear state of a brake of the one or more aircraft wheel brakes, is disclosed. The apparatus includes a processor configured to determine a wear relationship between a wear state of the brake and a number of use cycles of the brake, determine a predicted wear state of the brake based on the wear relationship; determine a number of future use cycles of the brake based on a predicted condition of the brake, the predicted condition comprising the predicted wear state of the brake; and provide an indication of the determined number of the future use cycles to ground crew and/or a pilot of the aircraft, wherein the number of future use cycles is the number of use cycles for which the brake is allowed to be (Continued)

used, and a use cycle comprises all uses of the brake relating to a flight undertaken by the aircraft.

21 Claims, 12 Drawing Sheets

(51) Int. Cl.
*F16D 66/00* (2006.01)
*F16D 66/02* (2006.01)
*B60T 8/17* (2006.01)
*B60T 8/58* (2006.01)
*B64C 25/42* (2006.01)
*B60T 8/171* (2006.01)
*B60T 8/32* (2006.01)

(52) U.S. Cl.
CPC .............. *B60T 8/58* (2013.01); *B64C 25/426* (2013.01); *B64F 5/60* (2017.01); *F16D 66/00* (2013.01); *F16D 66/021* (2013.01); *B60T 2270/406* (2013.01); *B64C 25/42* (2013.01); *F16D 2066/001* (2013.01); *F16D 2066/006* (2013.01)

(56) References Cited

U.S. PATENT DOCUMENTS

| | | | |
|---|---|---|---|
| 5,845,975 | A | 12/1998 | Wells |
| 7,673,721 | B2 * | 3/2010 | Bailey .................. F16D 66/021 188/1.11 L |
| 9,846,978 | B1 * | 12/2017 | Tseng ..................... G07C 5/008 |
| 10,336,473 | B2 | 7/2019 | Bill |
| 10,352,774 | B2 | 7/2019 | Miller |
| 10,597,148 | B2 | 3/2020 | Meinel Cheesman |
| 10,696,382 | B2 | 6/2020 | Bill et al. |
| 10,723,331 | B2 | 7/2020 | Bill et al. |
| 2003/0102191 | A1 | 6/2003 | DeVlieg |
| 2004/0220714 | A1 | 11/2004 | Rudd, III |
| 2005/0040286 | A1 | 2/2005 | Radford |
| 2005/0067232 | A1 | 3/2005 | Roberts |
| 2006/0108867 | A1 | 5/2006 | Ralea |
| 2006/0244310 | A1 | 11/2006 | DeVlieg |
| 2007/0251308 | A1 | 11/2007 | Canterbury et al. |
| 2009/0084637 | A1 * | 4/2009 | Bailey .................. F16D 66/021 188/1.11 E |
| 2014/0163815 | A1 | 6/2014 | Cahill et al. |
| 2014/0180506 | A1 | 6/2014 | Vaney et al. |
| 2014/0297095 | A1 * | 10/2014 | Vaney .................. F16D 66/026 701/29.4 |
| 2015/0025735 | A1 | 1/2015 | Mylaraswamy et al. |
| 2015/0203194 | A1 | 7/2015 | Griffith |
| 2016/0054249 | A1 | 2/2016 | Rateick |
| 2016/0281808 | A1 * | 9/2016 | Lamkin .................. B60T 17/22 |
| 2016/0318492 | A1 | 11/2016 | Miller |
| 2016/0362093 | A1 | 12/2016 | Gadzinski |
| 2018/0017467 | A1 | 1/2018 | Hiruta et al. |
| 2018/0290639 | A1 * | 10/2018 | Dirgo ..................... B60T 8/885 |
| 2019/0009891 | A1 | 1/2019 | Morris et al. |
| 2019/0017561 | A1 * | 1/2019 | Antanaitis ............... F16D 66/02 |
| 2019/0023151 | A1 | 1/2019 | Glinka |
| 2019/0071062 | A1 | 3/2019 | Robere et al. |
| 2019/0299944 | A1 | 10/2019 | Nilsson et al. |
| 2019/0329910 | A1 | 10/2019 | Bill |

FOREIGN PATENT DOCUMENTS

| | | |
|---|---|---|
| EP | 0443213 | 8/1991 |
| EP | 2988120 | 2/2016 |
| EP | 3088266 | 11/2016 |
| EP | 3 715 245 | 9/2020 |
| FR | 2305775 | 10/1976 |
| GB | 2470098 | 11/2010 |
| GB | 2554097 | 3/2018 |
| WO | 96/08396 | 3/1996 |
| WO | 02/12043 | 2/2002 |
| WO | 2006/072802 | 7/2006 |
| WO | 2008/097260 | 8/2008 |
| WO | 2017/062590 | 4/2017 |

OTHER PUBLICATIONS

Bacos, M.P. et al., "C/C Composite Oxidation Model-II. Oxidation Experimental Investigations", Carbon, vol. 38, pp. 93-103 (2000).
Bacos, M.P. et al., "C/C Composite Oxidation Model-III. Physical Basis, Limitations and Applications", Carbon, vol. 38, pp. 105-117 (2000).
Gao, Pengzhao et al., "Model-Free Kinetics Applied to the Oxidation Properties and Mechanism of Three-Dimension Carbon/Carbon Composite", Materials Science and Engineering A 432, pp. 226-230 (2006).
Guo and Xiao "Mechanisms and Modeling of Oxidation of Carbon Felt/Carbon Composites", Carbon, vol. 45, pp. 1058-1065 (2007).
Han, J.C. et al., "Oxidation and Ablation of 3D Carbon-Carbon Composite at up to 3000 °C", Carbon, vol. 33, No. 4, pp. 473-478 (1995).
Hollauer, Christian, Dissertation "Modeling of Thermal Oxidation and Stress Effects", Submitted to the Technical University of Vienna, Faculty of Electrical Engineering and Information Technology, Mittermoos 5, A3042 Würmia, Österreich, Austria, Matr. Nr. 9525349, 151 pages, Vienna, Jan. 2007, (Parts 1-5).
Chou and Hou, "Kinetics of High-Temperature Oxidation of Inorganic Nonmetallic Materials" Journal of American Ceramic Society, vol. 92(3), pp. 585-594 (2009).
Hou and Chou, "A Simple Model for the Oxidation of Carbon-Containing Composites", Corrosion Science, vol. 52, pp. 1093-1097 (2010).
Lehigh Unversity, "Wear of Materials", The Tribology Laboratory at Lehigh University, Department of Mechanical Engineering and Mechanics, <https://www.lehigh.edu/intribos/wear.html>, three pages, Feb. 5, 2021.
McKee, D.W. "Oxidation Behavior and Protection of Carbon/Carbon Composites", Carbon, vol. 25, No. 4, pp. 551-557 (1987).
Yen and Ishihara, "On Temperature-Dependent Tribological Regimes and Oxidation of Carbon-Carbon Composites up to 1800°C", Wear, vol. 196, pp. 254-262 (1996).
Zaeem and Kadiri "An Elastic Phase Field Model for Thermal Oxidation of Metals: Application to Zirconia", Computational Materials Science, vol. 89, pp. 122-129 (2014).
Nonfinal Office Action for U.S. Appl. No. 16/286,028, 39 pages, dated Dec. 22, 2020.
Bevilacqua, M. et al., "A Review of the Catalytic Oxidation of Carbon-Carbon Composite Aircraft Brakes", School of Engineering and Technology, University of Hertfordshire, College Lane, Hatfield, Herts AL10 9AB, United Kingdom, <https://www.researchgate.net/publication281675828>, 30 pages, available online Aug. 29, 2015.
Combined Search and Examination Report for United Kingdom Application No. GB 1811179. 9, nine pages, dated Feb. 25, 2019.
Combined Search and Examination Report for United Kingdom Application No. GB 1811178.1, six pages, dated Feb. 25, 2019.
Combined Search and Examination Report for United Kingdom Application No. GB 1817600.8, seven pages, dated Feb. 25, 2019.
Extended European Search Report for European Application No. EP 19159656.8, eight pages, dated May 31, 2019.
Partial European Search Report for European Application No. EP 19159658.4, 16 pages, dated Jul. 11, 2019.
Office Action issued in U.S. Appl. No. 16/286,028, 35 pages, dated May 11, 2021.
Zhang et al., "New insights into the early stages of thermal oxidation of carbon/carbon composites using electrochemical methods", Carbon, vol. 108, pp. 178-189, (2016).

* cited by examiner

APPARATUS AND METHOD FOR DETERMINING AIRCRAFT BRAKE FUTURE USE CYCLES

CROSS RELATED APPLICATIONS

This application claims priority to United Kingdom (GB) Patent Application 1803203.7, filed Feb. 27, 2018, and United Kingdom (GB) Patent Application 1817600.8, filed Oct. 29, 2018, the entire contents of each of which are hereby incorporated by reference.

TECHNICAL FIELD

The present invention relates to vehicle braking. Particularly, although not exclusively, the present invention relates to determining a number of future use cycles of a vehicle wheel brake such as an aircraft wheel brake.

BACKGROUND

The condition of an aircraft wheel brake may change with use. For example, the brake may undergo wear. The condition of the brake may eventually change to the point that a service or replacement of the brake or a component thereof may be required.

SUMMARY

A first aspect of the present invention provides an apparatus comprising a processor configured to: determine a number of future use cycles of an aircraft wheel brake based on a predicted condition of the brake.

Optionally, the predicted condition is a predicted future condition of the brake.

Optionally, the predicted condition comprises a predicted oxidation state of the brake.

Optionally, the oxidation state after a braking event is predicted using an oxidation model, based on an initial thermal oxidation state before the braking event and temperature profile of the brake with respect to time.

Optionally, the processor is configured to: determine the number of future use cycles by predicting the number of future use cycles required for the predicted oxidation state to reach an oxidation threshold.

Optionally, the predicted condition comprises a predicted wear state of the brake.

Optionally, the processor is configured to: determine the number of future use cycles by predicting the number of future use cycles required for the predicted wear state to reach a wear threshold.

Optionally, the processor is configured to: determine a wear relationship between a wear state of the brake and a number of use cycles of the brake; and determine the predicted wear state based on the wear relationship.

Optionally, the processor is configured to: determine the wear relationship based on one or more measured wear values.

Optionally, the predicted condition of the brake comprises a predicted brake length value, the predicted brake length value being determined based on a wear state of the brake and an oxidation length of the brake, the oxidation length being determined based on an oxidation state of the brake.

Optionally, the processor is configured to: determine the oxidation length based on an amount of mass lost from the brake as indicated by the oxidation state, an area of a brake disc of the brake and an original density of the brake.

Optionally, the processor is configured to: determine the predicted brake length value by subtracting the oxidation length from a wear value.

Optionally, the processor is configured to: determine the number of future use cycles by predicting the number of future use cycles required for the predicted brake length value to reach a brake length threshold.

Optionally, the processor is configured to: determine a brake length relationship between a brake length value and a number of use cycles of the brake; and determine the predicted brake length value based on the brake length relationship.

Optionally, the processor is configured to: compare the predicted condition of the brake to a condition of the brake determined based on one or more measured characteristics of the brake.

Optionally, the processor is configured to: determine whether or not a brake warning criterion is satisfied based on the comparison; and provide an indication that the brake warning criterion is satisfied.

A second aspect of the present invention provides an aircraft comprising: one or more aircraft wheel brakes; and the apparatus according to the first aspect.

A third aspect of the present invention provides a method comprising: determining a number of future use cycles of an aircraft wheel brake based on a predicted condition of the brake.

Optionally, in the method according to the third aspect, the predicted condition is a predicted future condition of the brake.

Optionally, in the method according to the third aspect: the predicted condition comprises a predicted oxidation state of the brake.

Optionally, in the method according to the third aspect, the oxidation state after a braking event is predicted using an oxidation model, based on an initial thermal oxidation state before the braking event and temperature profile of the brake with respect to time.

Optionally, the method according to the third aspect comprises: determining the number of future use cycles by predicting the number of future use cycles required for the predicted oxidation state to reach an oxidation threshold.

Optionally, in the method according to the third aspect: the predicted condition comprises a predicted wear state of the brake.

Optionally, the method according to the third aspect comprises: determining the number of future use cycles by predicting the number of future use cycles required for the predicted wear state to reach a wear threshold.

Optionally, the method according to the third aspect comprises: determining a wear relationship between a wear state of the brake and a number of use cycles of the brake; and determining the predicted wear state based on the wear relationship.

Optionally, the method according to the third aspect comprises: determining the wear relationship based on one or more measured wear values.

Optionally, in the method according to the third aspect, the predicted condition of the brake comprises a predicted brake length value, the predicted brake length value being determined based on a wear state of the brake and an oxidation length of the brake, the oxidation length being determined based on an oxidation state of the brake.

Optionally, the method according to the third aspect comprises: determining the oxidation length based on an amount of mass lost from the brake as indicated by the oxidation state, an area of a brake disc of the brake and an original density of the brake.

Optionally, the method according to the third aspect comprises: determining the number of future use cycles by predicting the number of future use cycles required for the predicted brake length value to reach a brake length threshold.

Optionally, the method according to the third aspect comprises: determining a brake length relationship between a brake length value and a number of use cycles of the brake; and determining the predicted brake length value based on the brake length relationship.

Optionally, the method according to the third aspect comprises: comparing the predicted condition of the brake to a condition of the brake determined based on one or more measured characteristics of the brake.

Optionally, the method according to the third aspect comprises: determining whether or not a brake warning criterion is satisfied based on the comparison; and providing an indication that the brake warning criterion is satisfied.

BRIEF DESCRIPTION OF THE DRAWINGS

Embodiments of the invention will now be described, by way of example only, with reference to the accompanying drawings, in which.

DETAILED DESCRIPTION

The following disclosure relates to systems and processes for determining a number of future use cycles of an aircraft wheel brake.

Figure 1:
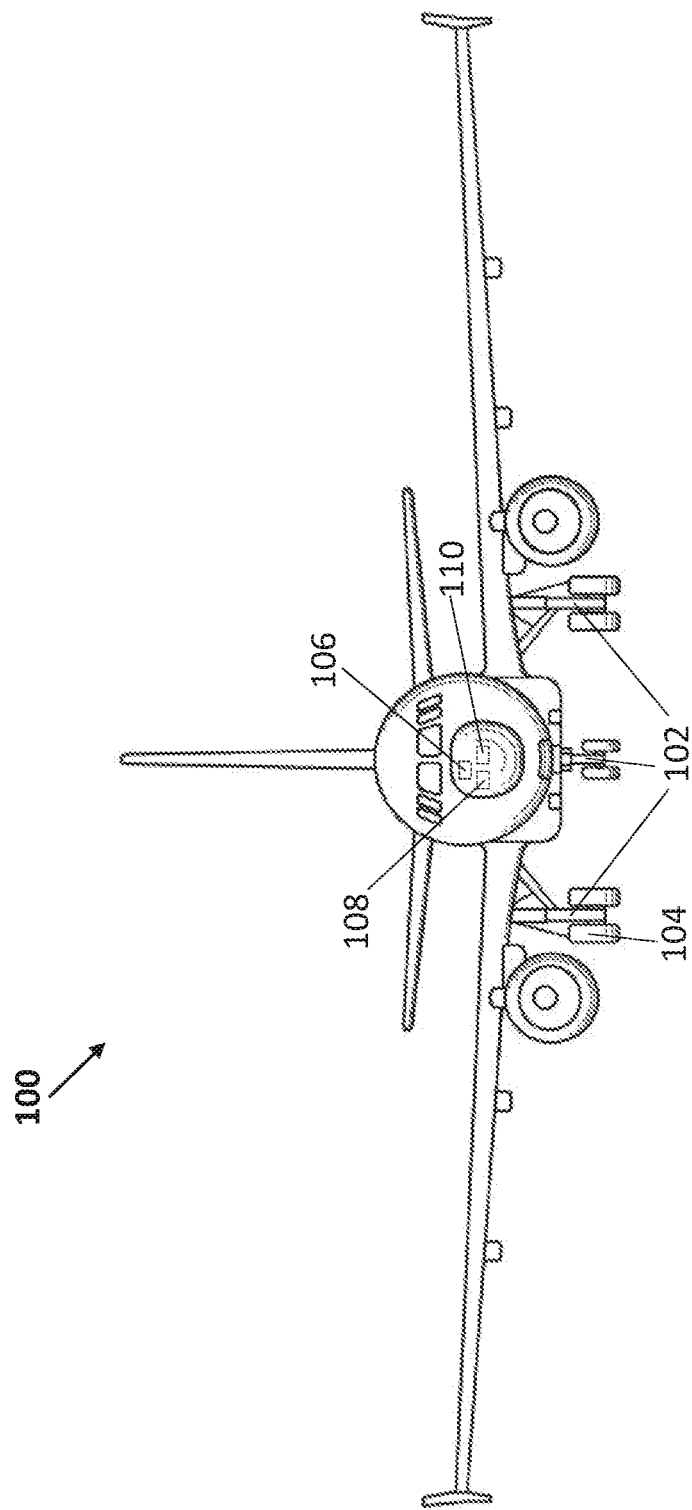
FIG. 1 is a schematic diagram depicting an aircraft on which examples may be deployed.

FIG. 1 is a simplified schematic view of an aircraft 100. The aircraft 100 comprises a plurality of landing gear assemblies 102. The landing gear assemblies may include main and nose landing gears that may be extended during take-off and landing. Each landing gear assembly 102 includes wheels such as wheel 104. The aircraft 100 comprises a computing system 106 which may, for example, comprise one or more processors and one or more computer readable storage media. The aircraft 100 may also comprise devices 108, such as instruments or sensors for measuring characteristics or parameters related to the aircraft, and instruments or sensors for measuring environmental characteristics. It should be appreciated that, in some examples, the devices 108 may be distributed at various different locations of the aircraft 100. The aircraft 100 may also comprise indicating devices 110 for providing various indications relating to the aircraft, examples of which indications will be described herein. The indicating devices may include screens which display text and/or graphics, dials, light indicators, sound indicators which emit sound to provide indications, and the like.

Figure 2:
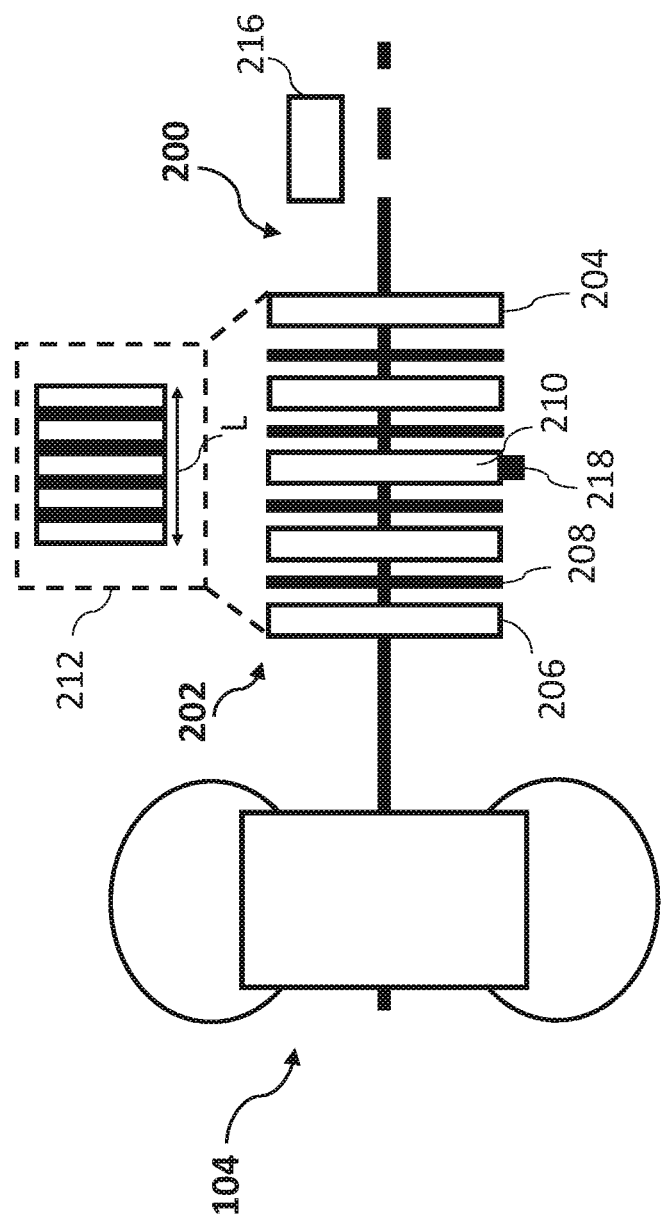
FIG. 2 is a schematic diagram depicting an aircraft wheel brake and a wheel of an aircraft landing gear according to an example.

FIG. 2 is a simplified schematic view of an aircraft wheel brake 200 (hereafter "brake" 200) associated with the wheel 104 of the aircraft 100. Each of the wheels of the aircraft 100 may have a brake such as brake 200 associated with it. The brake 200 applies a braking force to inhibit the rotation of the wheel 104. In this example, the brake 200 comprises a plurality of brake discs 202 including a pressure plate 204, a reaction plate 206, and a number of rotors and stators such as the rotor 208 and the stator 210. In this example, the brake discs 202 include a plurality of rotors and stators, and the brake assembly 200 is therefore a multiple disc brake. In other examples, the brake assembly 200 may not be a multiple-disc brake. It will be understood that the type of brake used in an aircraft landing gear depends on the characteristics of the aircraft in question, such as size, carrying capacity and the like.

When the aircraft 100 travels along the ground supported by the landing gear 102, the rotors rotate with the wheel 104, whereas the stators, the pressure plate 204 and the reaction plate 206 do not rotate with the wheel 104. When braking is applied, the pressure plate 204 is urged towards the reaction plate 206 so that the brake discs 202 come into contact with one another (as shown in box 212 of FIG. 2) and friction acts to inhibit the rotational motion of the rotors, thus generating a braking force to reduce the speed of the aircraft 100. The brake 200 may be hydraulically actuated or electrically actuated.

Any one or more of the rotors, stators, pressure plate 204 and the reaction plate 206 may be composed of Carbon-Carbon (CC) composites. A brake including brake discs composed of CC composites may be referred to as a carbon brake. For example, the brake discs 202 may be composed of a graphite matrix reinforced by carbon fibers. During use, the brake discs 202 may undergo oxidation. During an oxidation reaction, oxygen reacts with the carbon of the brake discs 202 causing carbon atoms to be removed from the brake discs 202 as carbon dioxide and/or carbon monoxide is produced leading to a loss of mass. The oxidation state/level of the brake 200 may be expressed as an amount of mass lost due to oxidation.

The brake discs 202 may oxidise via catalytic oxidation or thermal oxidation. Catalytic oxidation may occur when the oxidation reaction is aided by the action of a catalyst. For example, alkali metals are known catalysts for oxidation of CC composites. Catalytic oxidation may be relevant in areas where the air has relatively high salinity. Catalytic oxidation may also be relevant at airports that use runway de-icers comprising alkali salts. Thermal oxidation of the brake discs 202 may occur if the brake discs 202 reach high temperatures. During use, the brake 200, specifically the brake discs 202, may reach high temperatures. This is because when the brake 200 is applied to reduce the speed of the aircraft 100, some of the kinetic energy of the aircraft 100 is absorbed into the brake 200 as heat causing its temperature to rise. In the present examples, the components of the brake 200 composed of CC composites (i.e. the brake discs 202) undergo oxidation. However, the present disclosure hereafter refers to the oxidation state of the brake 200.

The brake discs 202 may undergo wear due to friction during braking. For example, material from the surface of a given brake disc may be lost due to the action of friction during braking when the given brake disc comes into contact with other brake discs. Wear may cause the length L of the brake discs 202 (shown in FIG. 2) to decrease. In the present examples, the brake discs 202 undergo wear. However, the present disclosure hereafter refers to the wear state of the brake 200.

Figure 3:
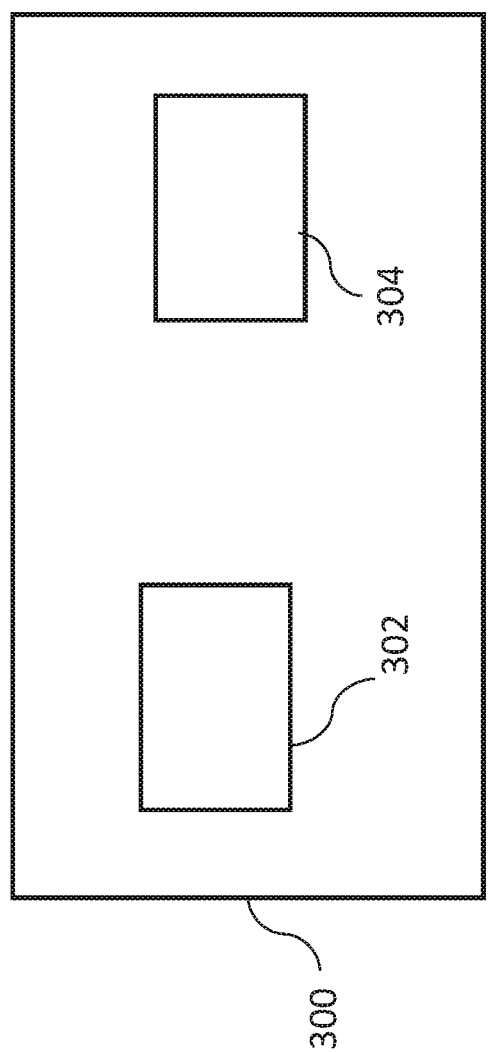
FIG. 3 is a schematic diagram of an apparatus according to an example.

FIG. 3 is a simplified schematic view of an apparatus 300, according to an example. The apparatus 300 comprises a processor 302. The processor 302 is configured to determine a number of future use cycles of the brake 200 based on a predicted condition of the brake 200. A use cycle of the brake 200 may be the time from when the aircraft 100 with the brake 200 installed thereon is at a departure gate before a flight to when the aircraft 100 is at an arrival gate after a flight. For example, a use cycle comprises all uses of the brake 200 relating to a respective flight undertaken by the aircraft 100.

The number of future use cycles of the brake 200 is the number of further use cycles for which the brake 200 is allowed to be used. A "future use cycle" as used herein is a use cycle of the brake 200 which has not yet occurred. For example, the brake 200 may be allowed to be used for as long as the brake 200 is in a condition deemed good and safe. As the brake 200 is used, its condition may change until it is in a condition which is not deemed good or safe. For example, the brake 200 may be in a condition not deemed good if it is worn and/or oxidised beyond a certain state as explained in further detail hereafter. When the brake 200 reaches or is close to a condition not deemed good, service or replacement of the brake 200 or components of the brake 200 may be scheduled and carried out. This assures safe operation of the aircraft 100.

The predicted condition may comprise a predicted oxidation state of the brake 200. Alternatively, or in addition, the predicted condition may comprise a predicted wear state of the brake 200. In some examples, the predicted condition may be a predicted future condition of the brake 200 as described hereafter.

The predicted oxidation state of the brake 200 may be the predicted thermal oxidation state of the brake 200. However, in some examples, the predicted oxidation state may also take into account catalytic oxidation.

In some examples, the predicted thermal oxidation state of the brake 200 may be determined using the methods and systems described in an earlier unpublished application, namely GB patent application number 1803203.7, attached hereto as an Annex. For example, the thermal oxidation state after a braking event may be predicted using an oxidation model, based on an initial thermal oxidation state before the braking event and a temperature profile of the brake 200 with respect to time. The processor 302 may receive the predicted thermal oxidation state of the brake 200 from an apparatus which determines the predicted thermal oxidation state of the brake 200. Alternatively, the up-to-date information regarding the predicted thermal oxidation state of the brake 200 may be stored in a computer readable storage medium (e.g. a computer readable storage medium which is part of the computing system 106), and the first controller 302 may retrieve the predicted thermal oxidation state of the brake 200 from said computer readable storage medium. The first controller 302 may retrieve the predicted thermal oxidation state of the brake 200 each time the predicted thermal oxidation state is updated. In some examples, the processor 302 may itself predict the thermal oxidation state of the brake 200 as described in the earlier unpublished application.

The temperature profile may be obtained from a temperature sensor 218 associated with the brake 200 (see FIG. 2). The temperature sensor 218 may be provided in thermal contact with one of the brake discs. In the example of FIG. 2, the temperature sensor 218 is provided on the stator 210. In this example, the stator 210 is the brake disc likely to reach the highest temperatures. The temperature sensor 218 may be any type of temperature sensor suitable for use in an aircraft brake assembly. For example, the temperature sensor 218 can function properly at the temperature ranges likely to be reached by the brake discs 202. For example, the temperature sensor 218 may be a thermocouple, a surface acoustic wave (SAW) sensor, an eddy current sensor, a resistance thermal sensor, a strain gauge, or the like. If a temperature sensor is provided on a part of the brake 200 other than on one of the brake discs 202, the temperature of the brake discs 202 may be determined using an indication of the relationship between a temperature measured by said temperature sensor and the temperature of the brake discs 202. In some examples, the indication of the relationship may be determined by experiment. In some examples, the indication of the relationship may be determined using a brake thermal model.

The temperature sensor 218 may measure the temperature of the stator 210 at given measurement intervals during a period of time when use of the brake 200 is expected. The lengths of the given measurement intervals may vary. The given measurement intervals may be regular, irregular or regular for one period of time and irregular for another period of time. For example, the temperature sensor 218 may measure the temperature such that a profile of the temperature of the stator 210 is captured with respect to time. In other words, the temperature sensor 218 measures the temperature of the stator 210 at given measurement intervals such that temperature information as a function of time is captured. For example, a processor of the computing system 106 may control the operation of the temperature sensor 218 based on instructions stored in a computer readable storage medium of the computing system 106. Temperature measurements captured by the temperature sensor 218 may be stored in a storage medium of the computing system 106, for example, along with associated time data.

The predicted thermal oxidation state may be the thermal oxidation state which the brake 200 is currently predicted to be in. In other words, the predicted thermal oxidation state may comprise a predicted current thermal oxidation state of the brake 200. The current thermal oxidation state may be predicted, for example, based on temperature measurements from the temperature sensor 218. The number of future use cycles of the brake 200 may be predicted based on the predicted current thermal oxidation state of the brake 200. For example, the more advanced the current thermal oxidation state is, the smaller the number of future use cycles of the brake 200 there may be.

In some examples, the predicted thermal oxidation state may be a predicted future thermal oxidation state of the brake 200. The predicted future thermal oxidation state of the brake 200 may be determined for a given future use cycle based on a predicted temperature profile of the brake 200 for that given future use cycle and the thermal oxidation state taking into account all previous use cycles. It should be appreciated that the predicted future thermal oxidation state may be determined in the same manner as the predicted current thermal oxidation state for use cycles that have already taken place, except using predicted temperature profiles. The predicted temperature profiles may be based on the temperature profiles of use cycles that have taken place. In some examples, predetermined predicted temperature profiles may be used. The predetermined predicted temperature profile may, for example, be stored in and retrieved from a computer readable storage medium of the computing system 106. The predicted temperature profiles may depend on the predicted itinerary of the aircraft 100, characteristics of the airports the aircraft 100 is to fly to and from, etc. The methods described in the mentioned previous unpublished application may be used to determine the predicted future thermal oxidation state.

The number of future use cycles may be determined by predicting the number of future use cycles required for the predicted oxidation state to reach an oxidation threshold. For example, the number of future use cycles may be determined by predicting the number of future use cycles required for the predicted future thermal oxidation state to reach the oxidation threshold.

The predicted thermal oxidation state (current or future) can be expressed as an amount of mass lost (e.g. as a percentage of the original mass of the brake 200) due to thermal oxidation. The oxidation threshold may also be expressed as an amount of mass lost. In some examples, the oxidation threshold may be 4% to 6.5% of the original mass of the brake 200 lost. For instance, the oxidation threshold may be 5.7% of the original mass of the brake 200 lost due to oxidation. The oxidation threshold may be part of the criterion according to which it is determined whether the brake 200 is in a good or safe condition, or a service or replacement is required.

The processor 302 may determine the predicted future thermal oxidation state for at least the number of future use cycles required for the predicted future thermal oxidation state to reach the oxidation threshold. In some examples, the oxidation threshold may be considered reached after a given number of future use cycles if the predicted future thermal oxidation state becomes equal to or exceeds the oxidation threshold in the next use cycle after the given number of future use cycles. In such examples, that given number of future use cycles may be the number of future use cycles of the brake 200 before a service or replacement of the whole or part of the brake 200 is required.

As described, in some examples, the predicted oxidation state may also take into account catalytic oxidation. For example, the predicted oxidation state may be determined taking into account the amount of time the aircraft 100 has spent in areas where the air has relatively high salinity and/or at airports that use runway de-icers comprising alkali salts. In these examples, the predicted future oxidation state may take into account the amount of time the aircraft 100 is expected to spend at such location for further use cycles.

Alternatively, or in addition, to the predicted condition comprising the predicted oxidation state of the brake 200, the predicted condition may comprise a predicted wear state of the brake 200. The predicted wear state may be the wear state the brake 200 is predicted to be in after future use cycles of the brake 200 have taken place. A wear state (i.e. an actual wear state) of the brake 200 may be determined using a measured wear value. The measured wear value may be a measured length relating to the brake 200. For example, the measured wear value may be the length L of the brake discs 202 (see FIG. 2), or a length from which the length L can be derived. The measured wear value provides an indication of the change in the length L. In the case where the brake 200 is electrically actuated and being controlled by an e-brake controller, the measured wear value may be the length L of the brake discs 202 measured by the e-brake controller. The e-brake controller may control the position of the pressure plate 204 relative to the reaction plate 206, for example, and may therefore be able to measure the length L.

In the case where the brake 200 is hydraulically actuated, a brake wear sensor 216 configured to measure the wear value may be provided. The brake wear sensor 216 may comprise a linear variable differential transformer (LVDT) sensor, or a Hall Effect sensor, configured to measure the linear displacement of a component of the brake 200. For example, such a brake wear sensor 216 may measure the linear displacement of the pressure plate 204 when the brake 200 is fully applied and the length L may be derived from the measured linear displacement.

In some examples, the measured wear value may be the remaining length of a wear pin (not shown) associated with the brake 200, for example. The wear pin may be a component which provides an indication of the change in the length L of the brake discs 202. For example, a reduction in the remaining length of the wear pin may correspond to a reduction in the length L of the brake disks 202. The remaining length of the wear pin may be the length of the wear pin which extends out from a component of the brake 200. For example, the remaining length of the wear pin may be its length which extends out from a surface of a piston housing of the brake 200, or another surface of the housing of the brake 200.

The wear pin may move together with the brake discs 202, and relative to the surface with respect to which its remaining length is measured. The wear sensor 216 may be a sensor which is fixed relative to the surface with respect to which the remaining length of the wear pin is measured. Such a sensor may measure the position of the wear pin relative to said surface and may therefore measure the change in the remaining length of the wear pin.

The wear state of the brake 200 may be represented by the measured wear value, e.g. the remaining length of the wear pin as measured by the brake wear sensor 216. As described, as the brake 200 becomes more worn, the length L of the brake discs 202 decreases. Therefore, the measured wear value as defined herein decreases as use cycles take place. The predicted wear state may be represented by a predicted wear value which may be a predicted length relating to the brake 200, e.g. a predicted remaining length of the wear pin. In the examples described hereafter, the actual and predicted wear states are represented by measured and predicted wear values which decrease as the brake 200 becomes more worn.

In examples where the predicted condition comprises a predicted wear state of the brake 200, the predicted wear state may be determined based on the wear state of the brake 200. For example, the processor 302 may be configured to determine a wear relationship between the wear state and the number of use cycles of the brake 200. The processor 302 may be configured to determine the predicted wear state based on the wear relationship as described hereafter. The processor 302 may be configured to determine the wear relationship based on one or more of the measured wear values. For example, the wear state may be measured for a number of use cycles that take place and considered with respect to the total number of use cycles of the brake 200 that have taken place. In the examples described hereafter, the wear state is measured for each use cycle that takes place.

Figure 4:
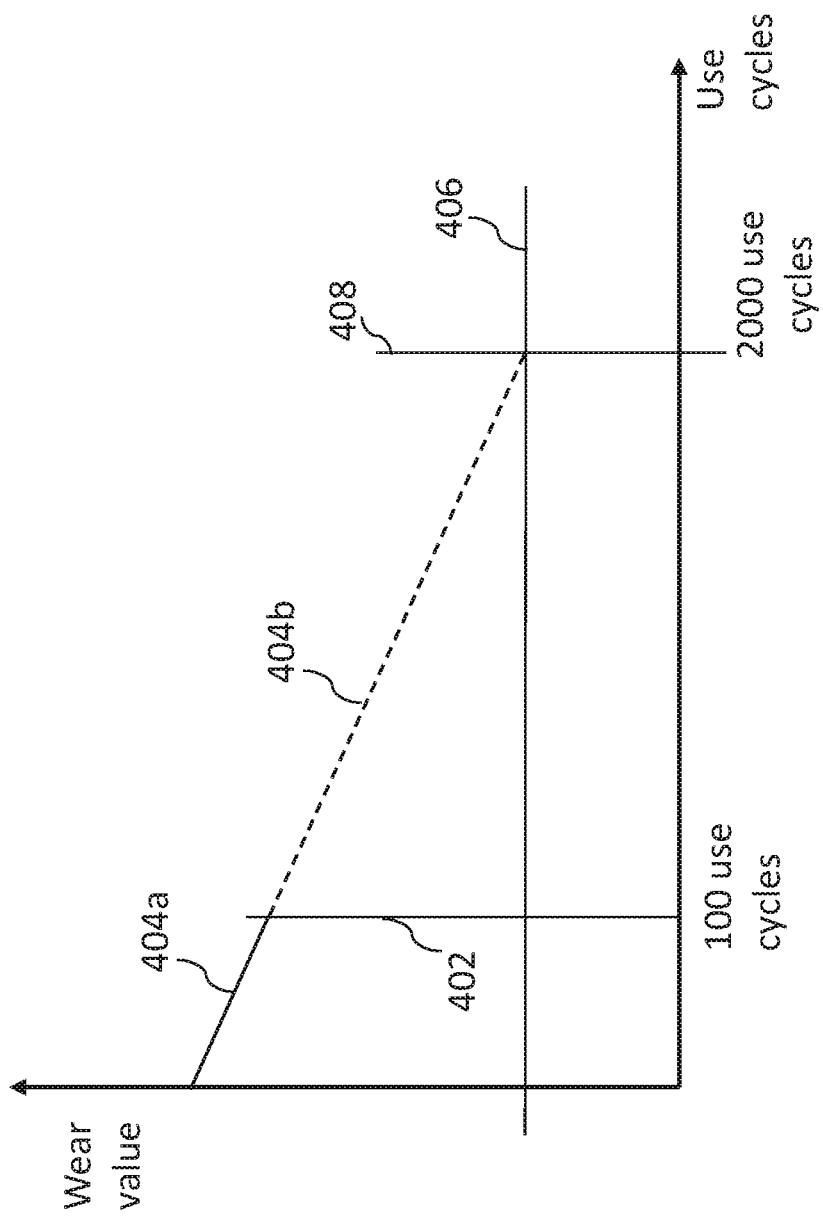
FIG. 4 is a first graph illustrating the condition of an aircraft wheel brake as a function of the number of use cycles of the brake according to an example.

FIG. 4 is a graph illustrating the wear state and the predicted wear state as a function of the number of use cycles of the brake 200 according to an example. The vertical axis of the graph of FIG. 4 represents the wear value (measured or predicted), whereas the horizontal axis represents the number of use cycles. In this example, a hundred use cycles have taken place (i.e. the aircraft 100 has undertaken 100 flights with the brake 200 installed). Therefore, values of the wear state as measured by the brake wear sensor 216 for each of the use cycles that have taken place are to the left of the line 402. The line 402 is a vertical line intersecting the horizontal axis at one hundred use cycles. Individual values of the wear state are not shown for convenience. Instead, the solid line 404a which is fitted to the values of the wear state is shown.

The solid line 404a may be determined using any known data fitting method. For example, the processor 302 may use Simple Linear Regression analysis to determine the solid line 404a. Examples of other methods of fitting data include the Least Square method, Least Absolute Residual method, Bisquare fitting method, etc. It will be appreciated that any suitable data fitting method may be used.

In this example, a linear function is used to fit the values of the wear state to generate the solid line 404a, which is a straight line. However, in some examples, a different function may be used. For example, a polynomial function, an exponential function or another function which can describe the decrease of the wear state values as a function of use cycles may be used.

As described, a linear function is used in the example of FIG. 4. The linear function may be expressed according to Equation 1 below:

$$y = mx + c \quad (1)$$

In Equation (1) above, y represents values of the wear state, x represents the number of use cycles, m represents the amount of brake wear per use cycle (i.e. the gradient of the linear fit to the values of the wear state), and c represents the wear state when no use cycles have taken place (i.e. the value of the measured wear value when no use cycles have taken place—this may be the starting length of the wear pin, for example).

By fitting the values of the wear state, the values of the parameters in the fit function being used which are unknown may be determined. In this example, the value of m may be determined by fitting the values of the wear state using Equation (1). The function which is used to fit the wear state values and the parameters determined from the fit represent the wear relationship.

In order to determine a predicted wear state (i.e. a predicted wear value in this example) after a given number of use cycles have taken place, that given number of use cycles may be inserted into Equation (1) as a value of parameter x. Then, using the values of the parameters known from the fit on the right-hand side of Equation (1), the predicted wear state after that given number of use cycles may be calculated (i.e. the value of parameter y when x is equal to the given number of use cycles). In FIG. 4, the dashed line 404b represents values of the predicted wear state as a function of the number of use cycles. In other words, a line (i.e. the dashed line 404b—according to the fit function and determined parameters) may be determined for values of the number of use cycles greater than the number of use cycles that have actually taken place. In this example, the predicted wear states for respective number of use cycles are the values falling on the dashed line 404b.

The number of future use cycles may be determined by predicting the number of future use cycles required for the predicted wear state to reach a wear threshold. In the example of FIG. 4, the wear threshold is indicated by the horizontal line 406. In this example, the wear threshold is reached at the number of use cycles at which the dashed line 404b intersects the horizontal line 406 representing the wear threshold (i.e. the number of use cycles at which the predicted wear state reaches the wear threshold). The number of use cycles at which the predicted wear state reaches the wear threshold is represented by the line 408 in FIG. 4. In some examples, the wear threshold may be considered reached after a given number of future use cycles if the predicted wear value becomes equal to or exceeds the wear threshold in the next use cycle after that given number of future use cycles. In this example, the wear threshold is predicted to be reached after 2000 use cycles.

Therefore, the number of future use cycles of the brake 200 is the number of use cycles between the line 402 and line 408 in FIG. 4, in this example. In this example, the number of future use cycles of the brake 200 before a service or a replacement of the whole or part of the brake 200 is required in one thousand and nine hundred.

In the previously described examples, the number of future use cycles of the brake 200 is determined based on either the predicted wear state of the brake 200 or the predicted oxidation state of the brake 200. The predicted wear state may be used in examples where the brake 200 is expected to undergo a relatively higher amount of wear as compared to the amount of thermal oxidation. This may be the case if the aircraft 100 flies to and from airports that have long runways and taxiing routes such that high energy braking, which would cause the brake discs 202 to reach high enough temperatures for thermal oxidation to be significant, is not often required. For example, it may be the case that at airports to/from which the aircraft 100 flies, high energy braking is typically not required, but many braking applications are required (e.g. at a busy airport with many aircraft landing and taking off). It should be appreciated that the amount of brake wear correlates with the number of braking applications.

On the other hand, the predicted thermal oxidation state may be used in examples where the brake 200 is expected to undergo relatively higher amount of the thermal oxidation as compared to the amount of brake wear. This may be the case if the aircraft 100 flies to airports which have short runways and require high energy braking causing the brake discs 202 to reach temperatures at which thermal oxidation is significant.

In some examples, the predicted condition of the brake 200 may comprise the predicted oxidation state and the predicted wear state. In these examples, the oxidation threshold and the wear threshold may be used. For example, the number of future use cycles of the brake 200 may be the number of future use cycles required for at least the predicted future thermal oxidation state to reach the oxidation threshold, or the predicted wear state to reach the wear threshold.

For example, the number of future use cycles may be the number of future use cycles for the first of the wear threshold, or the oxidation threshold to be reached. If the predicted wear state reaches the wear threshold in fewer future use cycles, the number of future use cycles is the number of future use cycles for the wear state to reach the wear threshold. On the other hand, if the predicted future thermal oxidation state reaches the oxidation threshold in fewer future use cycles, the number of future use cycles is the number of future use cycles for the predicted future thermal oxidation state to reach the oxidation threshold. In these examples, both the predicted wear state and the predicted future thermal oxidation state is taken into account to determine the number of future use cycles of the brake 200.

In some examples both brake wear and oxidation may be taken into account for determining the number of future use cycles in a different manner. For example, the predicted condition of the brake 200 may comprise a predicted brake length value. The predicted brake length value may be determined based on a wear state of the brake 200 and an oxidation length of the brake 200. The oxidation length may be determined based on an oxidation state of the brake 200. The processor 302 may determine predicted brake length values for use cycles that have taken place. The processor 302 may also determine predicted brake length values for future use cycles.

The oxidation length may be determined based on an amount of mass lost from the brake as indicated by the corresponding oxidation state, an area of a brake disc of the brake discs 202 and an original density of the brake 200. The oxidation length is a hypothetical length which corresponds to the amount of material lost from the brake discs 202 due to oxidation. As described, the oxidation state may be an amount of mass of the brake 200 lost due to oxidation reactions. It should be appreciated that oxidation, specifically thermal oxidation, may not act uniformly on a particular surface of a brake disc and may take place up to a certain depth inside the brake disc in question. Therefore, oxidation may not necessarily result in a change in the physical dimensions of the brake discs 202. However, the mass lost due to oxidation may be converted into the hypothetical oxidation length in the following manner.

Figure 5:
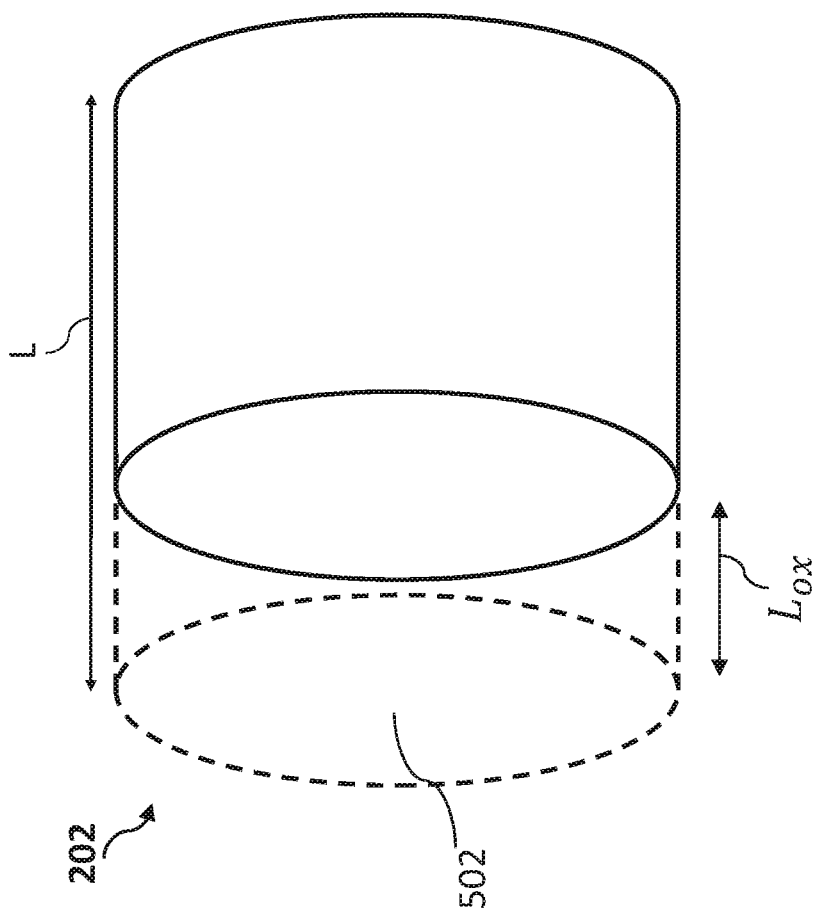
FIG. 5 is a schematic diagram of the brake discs of an aircraft wheel brake according to an example.

It will be appreciated that the density of the brake discs 202 may change when mass is lost due to oxidation. However, for the purpose of this calculation, it is assumed that the density has not changed from the original density (before any oxidation took place). FIG. 5 schematically illustrates the brake discs 202. For simplicity, separate brake discs such as the rotor 208, stator 210, etc. are not shown, instead all of the brake discs 202 are represented as one cylindrical element. The surface area A of the surface 502 indicated in FIG. 5 may be known, e.g. from data provided by the manufacturer of the brake 200 or otherwise determined by measurement. The oxidation length may be determined according to Equation (2).

$$L_{ox} = \frac{\Delta m_{ox}}{A \times \rho} \quad (2)$$

In Equation (2), $L_{ox}$ is the oxidation length, $\Delta m_{ox}$ is the mass lost due to oxidation, A is the surface area of the surface 502 of the brake discs 202 as described, and p is the original density of the brake discs 202 (e.g. as provided by the manufacturer of the brake 200 or determined by measurement). The oxidation length $L_{ox}$ is shown in FIG. 5.

Although the oxidation length $L_{ox}$ is not a real length by which the length L of the brake discs 202 is reduced, it nonetheless provides a measure of the oxidation state of the brake 200. Since the wear state of the brake 200 is represented as a reduction in the length L, it may be advantageous to represent the oxidation state also as a length in order to assess the condition of the brake 200.

The predicted brake length value may be determined by subtracting the oxidation length from the wear value. For example, for a given use cycle, the respective oxidation length $L_{ox}$ may be subtracted from the respective measured wear value to obtain the respective brake length. The predicted brake length may therefore account for brake wear as well as oxidation of the brake 200.

Figure 6:
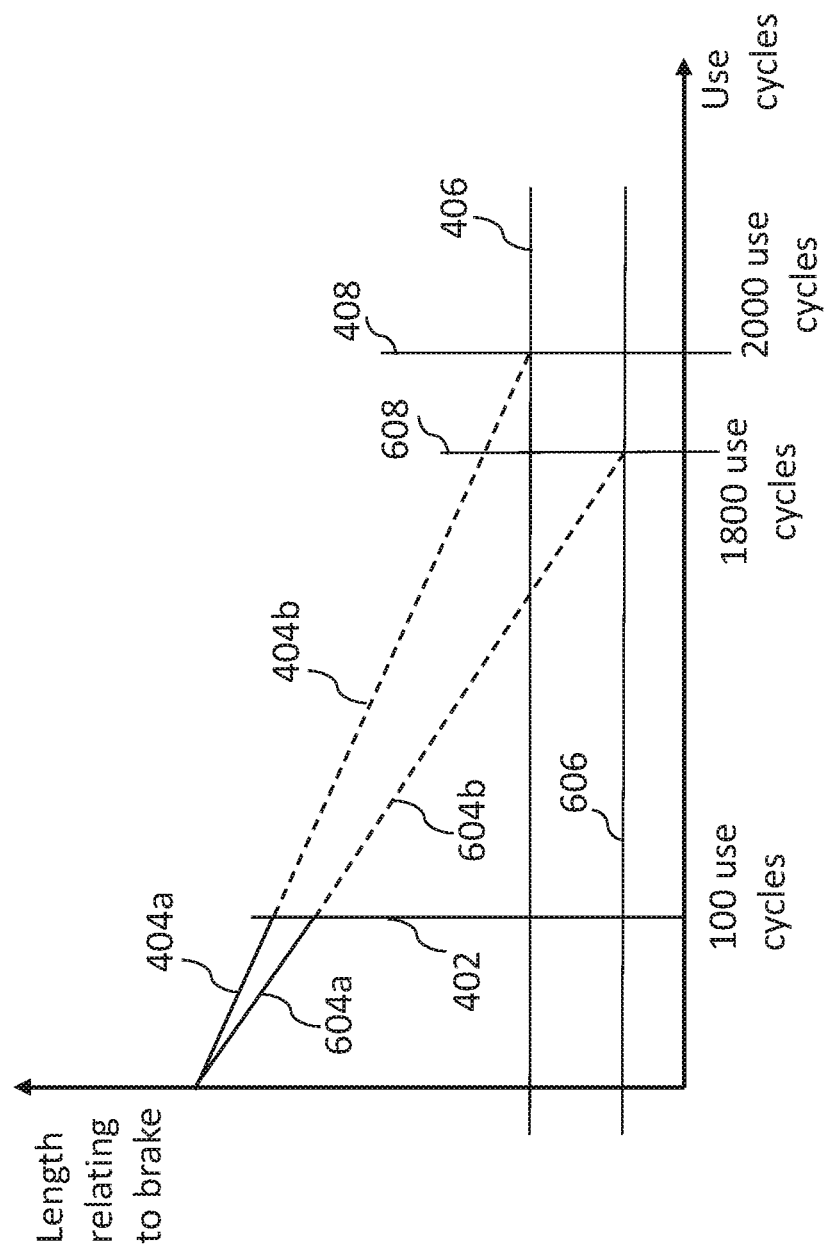
FIG. 6 is a second graph illustrating the condition of a brake as a function of the number of use cycles of the brake according to an example.

The processor 302 may determine a brake length relationship between the brake length value and the number of use cycles of the brake 200. The processor 302 may determine the predicted brake length (i.e. for a future use cycle) based on the brake length relationship. The brake length relationship may be determined in a similar manner to the wear relationship described previously. FIG. 6 is a graph illustrating the wear state, predicted wear state, brake length and predicted brake length according to an example. The vertical axis of the graph of FIG. 6 represents a length relating to the brake 200, which may be the measured wear value, predicted wear value, predicted brake length value or predicted future brake length value. The horizontal axis represents the number of use cycles. In this example, one hundred use cycles have taken place (as in the example of FIG. 4). Values of the wear state as measured by the brake wear sensor 216 are to the left of the line 402 which is a vertical line intersecting the horizontal axis at one hundred use cycles. The upper solid line 404a represents the values of the wear state as in FIG. 4.

Values of the predicted brake length determined using the respective measured wear values and the oxidation lengths (calculated from respective predicted current thermal oxidation states) are also to the left of the line 402. The lower solid line 604a is fitted to the values of predicted brake length. The values of predicted brake length may be fitted in a similar manner to the fits described with respect to the wear state. For example, the Equation (1) may be used to fit the predicted brake length values. The function which is used to fit the values of the predicted brake length and the associated parameters determined from the fit represent the brake length relationship. The predicted future brake length may be determined in the same manner as the predicted wear state. For example, the predicted wear value may be determined using the fit of the values of the brake length as previously described in the context of the predicted wear state. In FIG. 6, the predicted brake length is represented by the lower dashed line 604b.

In some examples where the brake length is used, the predicted wear state represented by the upper dashed line 404b may be determined. The predicted wear state may be determined as previously described. In addition, in such examples, the predicted oxidation state may also be determined as describe previously. The predicted wear state and the predicted oxidation state may then be used to determine the predicted brake length values for future use cycles (i.e. the values on the lower dashed line 604b). For example, predicted brake lengths for future use cycles may be determined from respective predicted future thermal oxidation states and subtracted from predicted wear values in order to generate the lower dashed line 604b.

The predicted brake length values may be determined for at least the number of future use cycles for the predicted brake length to reach a brake length threshold. The number of future use cycles of the brake 200 may be determined by predicting the number of future use cycles required for the predicted brake length value to reach the brake length threshold. In the example of FIG. 6, the brake length threshold is represented by horizontal line 606. In some examples, the brake length threshold may be considered reached after a given number of future use cycles if the predicted brake length value becomes equal to or exceeds the brake length threshold in the next use cycle after the given number of future use cycles. The number of use cycles at which the predicted brake length value reaches the brake length threshold is represented by the line 608. In this example, the brake length threshold is predicted to be reached after 1800 use cycles. Therefore, the number of future use cycles of the brake is one thousand and seven hundred in this example. In this examples, the brake length threshold is below the wear threshold indicated by horizontal line 406. However, in other examples, the brake length threshold may be at the same level as the wear threshold.

The wear relationship and/or the brake length relationship may be updated as future use cycles take place. For example, when more use cycles have taken place, the wear relationship and/or the brake length relationship may be updated to take account of the latest use condition values.

In examples in which the wear relationship and/or the brake length relationship is determined, data for a certain number of use cycles may be required before the wear relationship and/or the brake length relationship can be determined in a way that provides reasonably accurate values of the predicted condition. For example, the certain number of use cycles may be required before a fit with acceptable associated errors can be produced based on which the predicted condition is determined. In some examples, the use condition for a hundred use cycles may be required before the wear relationship and/or the brake length relationship is determined.

An indication of the number of future use cycles of the brake 200 may be provided to ground crew and/or a pilot of the aircraft 100 and/or other persons involved in the maintenance of the aircraft 100. For example, such an indication may be provided using one or more of the indicating devices 110. In some examples, the number of future use cycles may be communicated (e.g. via a data communication network) to an apparatus remote from the aircraft 100. This may advantageously allow scheduling of a service of the brake 200. If it is known when the brake 200 may require a service or replacement of the whole or a part of the brake 200, delays due to grounding of the aircraft 100 (when it's discovered that the brake 200 requires a service etc.), short notice scheduling of a service of the brake 200, etc. may be avoided. The operational efficiency of the aircraft 100 may therefore be increased as compared to there being no indication of the number of future use cycles of the brake 200.

The processor 302 may be configured to compare the predicted condition of the brake 200 to a condition of the brake 200 determined based on one or more measured characteristics of the brake 200. For example, the processor 302 may compare the predicted wear state for a given use cycle to the wear state (i.e. the measured wear value) for that given use cycle, once that given use cycle has occurred. For example, the processor 302 may compare the predicted brake length value for a given use cycle that was determined prior to that given use cycle taking place (e.g. using the brake length relationship as described) to the predicted brake length value determined using the measured wear value and the oxidation length for that given use cycle, after that given use cycle has taken place.

Based on the comparison, the processor 302 may determine whether or not a brake warning criterion is satisfied.

For example, the processor 302 may determine an expected brake condition range for the next use cycle and the brake warning criterion may be satisfied if the predicted condition in question falls outside the expected brake condition range. For example, if the condition of the brake 200 for a given number of use cycles is known (e.g. the wear state of the brake 200/the brake length values of the brake 200), the processor 302 may determine a range within which the condition for the next use cycle is expected to fall. The expected brake condition range may be a range centered on the predicted condition for the next use cycle. In the examples where the predicted condition is determined based on the wear relationship or the brake length relationship, the expected brake condition range may be determined according to the error values associated with the fit (e.g. the fit of the wear state or brake length using Equation (1)) used to determine the wear relationship or the brake length relationship. It should be appreciated that any data fit has an error associated with it related to how accurately the fit represents the relevant data. For example, there may be a standard deviation value associated with the predicted condition for each future use cycle. In some examples, the expected brake condition range for the next use cycle may include values twice the standard deviation (in the predicted use condition according to the relevant fit) above and below the predicted condition for the next use cycle.

For example, if one hundred use cycles have already taken place as in the example of FIG. 4, the processor 302 may determine the expected wear state range for the hundred and first use cycle. The expected wear state range may be twice the standard deviation associated with the fit above and below the predicted wear state for the next use cycle. In other examples, the expected brake condition range may be determined in a different manner. For example, when only oxidation is considered, the expected brake condition range for the next use cycle may be determined according to the worst and best expected temperature characteristics of the brake 200 that can be expected for the next use cycle. The worst expected temperature characteristics may include the brake 200 being at relatively high temperatures for relatively long periods of time, whereas the best expected temperature characteristics may include the brake 200 avoiding high temperatures as much as can be reasonable expected for the next use cycle (e.g. taking into account runway lengths etc. for the next use cycle).

When the next use cycle has occurred, the processor 302 may determine whether the relevant condition falls outside of the expected brake condition range. After the next use cycle occurs, the processor 302 may determine the relevant condition based on the relevant up to date measurements and compare that condition to the expected brake condition range. For example, the processor 302 may have determined an expected wear state range for the hundred and first use cycle before the hundred and first use cycle occurs. After the hundred and first use cycle has occurred, the processor 302 may receive an up to date measured wear value from the wear sensor 216 and determine the up to date wear state. The processor 302 may then check whether the up to date wear state falls outside of the expected wear state range. The processor 302 may similarly compare the up to date brake length, oxidation state, etc. to the expected brake length range, the expected oxidation range, etc., as appropriate.

The condition of the brake 200 falling outside of the expected brake condition range, may indicate unexpected or unusual behaviour of the brake 200. The processor 302 may be configured to provide an indication that the brake warning criterion is satisfied. An indication may be provided to the ground crew and/or the pilot of the aircraft 100 if the condition falls outside of the expected brake condition range, e.g. using one of the indicating devices 110. In some examples, such an indication may be provided if the condition falls outside of the respective expected brake condition range for a given number of consecutive (e.g. three) use cycles. For example, service or replacement of the whole or part of the brake 200 may take place, or a recommendation relating to braking behaviour (i.e. how brakes are applied) may be made based on such an indication. In some example, a particular brake control function which controls braking operations to control the condition of the brake 200 may be activated.

The processor 302 may perform any of the above described processes as methods to determine a number of future use cycles of the brake 200 based on a predicted condition thereof. The apparatus 300 may comprise a computer readable storage medium 304 with instruction stored thereon, which, when executed by the processor 302 cause the processor 302 to perform the methods according to the described examples.

The apparatus 300 which performs such methods may be deployed on the aircraft 100. In some examples, the processor 302 may be a processor of the computing system 106 and the computer readable storage medium 304 may be a computer readable storage medium of the computing system 106. In some examples, the apparatus 300 may be remote from the aircraft 100. In such examples, the apparatus 300 may be provided with relevant information, e.g. measured use characteristics, etc., for the apparatus 300 to carry out the described processes.

Figure 7:
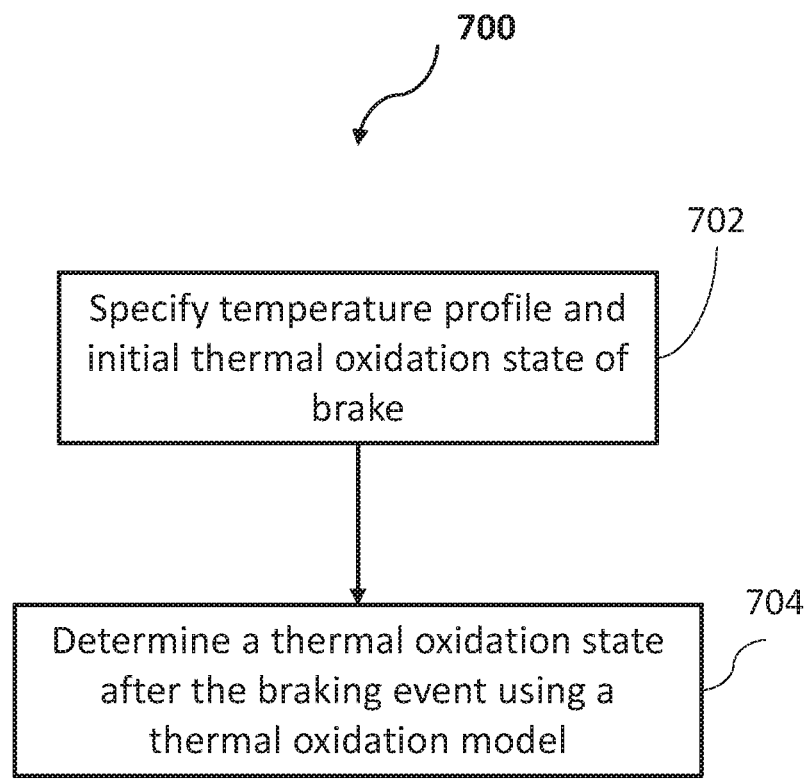
FIG. 7 is a flow diagram of an exemplary method of determining the thermal oxidation state of a brake of an aircraft landing gear.

FIG. 7 summarizes a method 700, according to an embodiment of the present invention, of determining a thermal oxidation state of a brake, such as the brake assembly 200, of an aircraft landing gear assembly 102. The method 700 involves determining a thermal oxidation state of the brake assembly 200 after a braking event, using a thermal oxidation model based on an initial thermal oxidation state (which may also be referred to as the initial thermal oxidation level) before the braking event and a temperature profile of the brake with respect to time. The determined thermal oxidation state of the brake assembly 200 after the braking event may be referred to as an updated thermal oxidation state. This is because the thermal oxidation state of the brake assembly 200 after the braking event takes account of the change in the initial thermal oxidation state due to the braking event.

The braking event is an event relating to the application of the brake assembly 200. For example, a braking event may comprise one or more applications of the brake assembly 200 to slow or stop the aircraft 100. In some examples, the braking event may be a part of a time during which the brake assembly 200 is continuously being applied. Any time the brake assembly 200 is applied, the temperature of the brake assembly 200 may rise. This is because when brake assembly 200 is applied to reduce the speed of the aircraft 100, some of the kinetic energy of the aircraft 100 is absorbed into the brake assembly 200 as heat causing its temperature to rise. Therefore, whether or not the brake assembly 200 has been applied can be determined based on temperature variations of the brake assembly 200.

At block 702 of the method 700, the temperature profile and the initial thermal oxidation state of the brake assembly 200 are input. As explained above, the temperature profile indicates a variation of temperature with time. The input temperature profile may, for example, relate to a use cycle of the aircraft 100. For example, the temperature profile may be for an entire use cycle of the aircraft 100, e.g. the time from when the aircraft 100 is at a departure gate before a flight to when the aircraft 100 is at an arrival gate after a flight. Specifically, the temperature profile may indicate the variation of temperature over time for all braking events that take place during a cycle. In other examples, the temperature profile may not be for an entire use cycle of the aircraft 100. For example, the temperature profile may be over a single braking event, or a part of a cycle with many braking events. In some examples, a number of temperature profiles belonging to a particular use cycle may be used to determine the thermal oxidation state of the brake assembly 200 after that use cycle.

The temperature profile may, for example, relate to a use cycle that has occurred. In other words, the temperature profile may include actual data from the temperature sensor 216 of the aircraft 100 during a previous use cycle. In such examples, the temperature profile relates to real data. On the other hand, in some examples, the temperature profile may be a predicted temperature profile of a predicted future use cycle of the aircraft 100. In that context, a braking event may be a predicted future braking event.

The initial thermal oxidation state of brake assembly 200 is the thermal oxidation state of the brake assembly 200 before the braking event for which the updated thermal oxidation state is being determined. For example, for a new brake assembly 200 installed in aircraft 100, the initial oxidation state may indicate no oxidation. In some examples, the initial oxidation state for a newly installed brake assembly 200 may be set at installation by aircraft maintenance personnel and may either indicate no oxidation or some oxidation as assessed by the person(s) performing the installation. In examples where the brake assembly 200 is not new, the initial oxidation state may be the oxidation state calculated at a previous instance of method 700 being performed. In some examples, a brake or a brake component which is not new may be installed on aircraft 100. If the temperature profile information for all previous braking events involving that brake or brake component is available, the thermal oxidation state at installation may be determined using the available temperature profile information using method 700, or by other methods disclosed herein.

At block 704 of method 700, a thermal oxidation state after the braking event (updated thermal oxidation state) is determined using a thermal oxidation model. For example, a thermal oxidation model is applied based on the input temperature profile and the initial thermal oxidation state of the brake assembly 200. A thermal oxidation model, for example, indicates how the thermal oxidation state is expected to change with time for various temperatures starting from the initial thermal oxidation A thermal oxidation model is a model of the evolution of the thermal oxidation of the brake. Which thermal oxidation model is used may depend, for example, on the initial thermal oxidation state. The details and selection of appropriate thermal oxidation models is described further below. In some examples, the method 700 may be performed live during a use cycle of the aircraft 100. In the case of the method 700 being performed live (i.e. in real time or near real time), the temperature profile used may be from the temperature data acquired thus far by the temperature sensor 216, for example. At block 704, therefore, it is determined how the oxidation state, starting from the initial oxidation state, has changed as a result of the increased temperature associated with the braking event in question.

After the updated thermal oxidation state has been determined, the initial thermal oxidation state may be set to the updated thermal oxidation state. In this way, the initial thermal oxidation state is kept up to date with all previous braking events. In examples where the temperature profile relates to more than one braking event, the method 700 may be performed again in order to determine an updated thermal oxidation state after a subsequent braking event. Updating the initial thermal oxidation state in this manner may ensure that the initial thermal oxidation state being used for a subsequent braking event accounts for all the previous braking events.

In examples where the temperature profile for an entire use cycle of the aircraft 100, the method 700 may be performed to determine respective updated thermal oxidation states after each braking event within that use cycle. It will be understood that this process may be carried out sequentially in relation to the chronology of the braking events. This is so that the determination of the updated thermal oxidation state for each of the braking events is done from a starting point (an initial thermal oxidation state) which takes account of all previous braking events.

In the method 700, the updated thermal oxidation state after a braking event may, for example, be determined based on a high temperature interval, the initial thermal oxidation state and a thermal oxidation rate parameter, using an appropriate thermal oxidation model.

Figure 8:
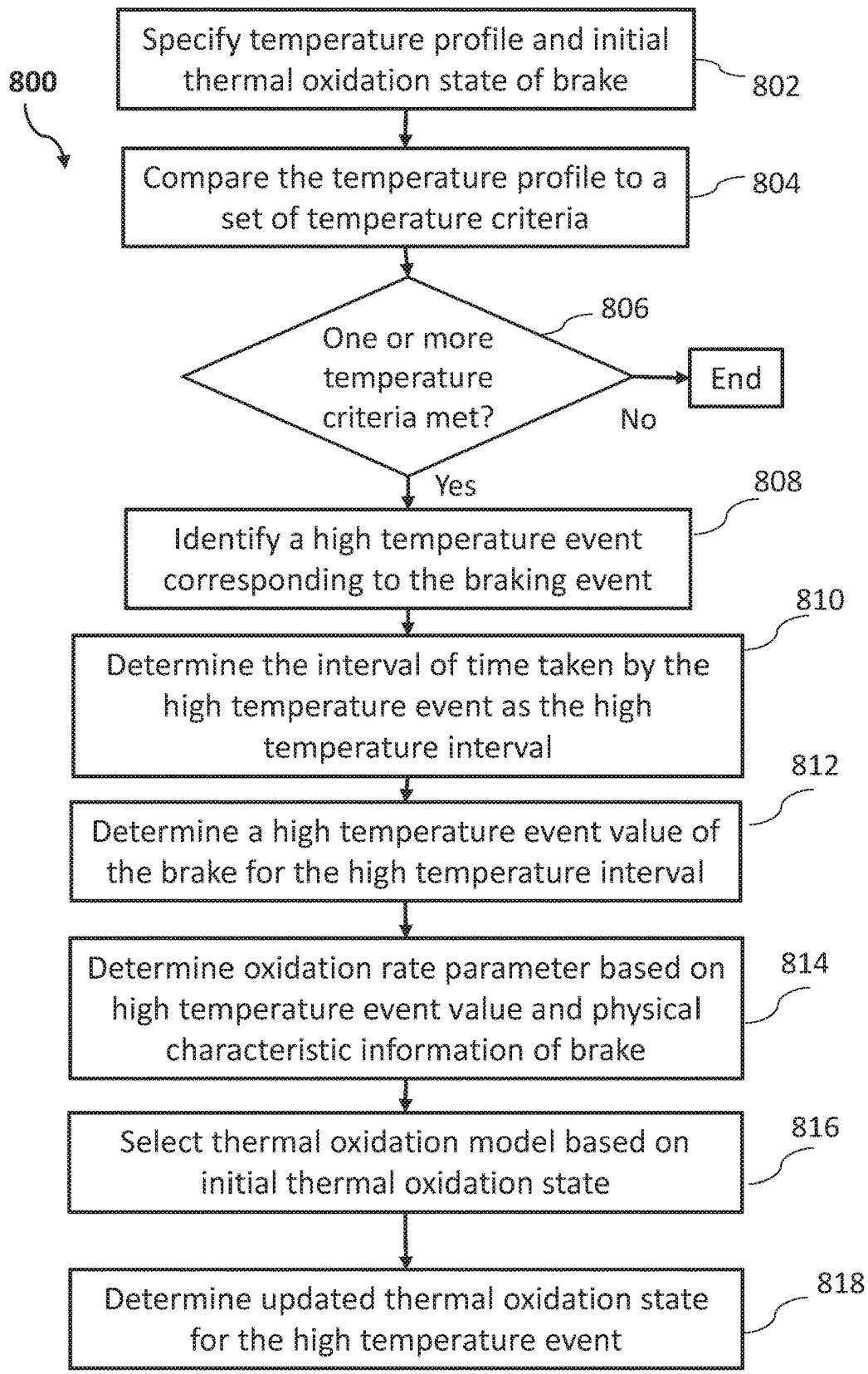
FIG. 8 is a flow diagram of an exemplary method of determining the thermal oxidation state of a brake of an aircraft landing gear.

FIG. 8 is a flow diagram of a method 800 showing acts that may be performed as part of method 700. For example, the method 800 involves more specific examples of the block 704 of the method 700. Block 802 is identical to block 702 of the method 700, in that a temperature profile of the brake with respect to time and the initial thermal oxidation state of the brake assembly 200 are input. At block 804, the temperature profile is compared to a set of temperature criteria. The set of temperature criteria may include a set of temperature thresholds. For example, the set of temperature criteria may include a first temperature threshold of 400° C. and a second temperature threshold of 750° C. In other examples, different temperature thresholds may be used depending on the physical properties of the brake assembly 200. The comparison of the temperature profile may, for example, take place sequentially in time order of the temperature data contained in the temperature profile. For example, a temperature value may be compared to the set of temperature thresholds, and subsequently, the next temperature value in time may be compared to the set of temperature thresholds.

At block 806, it is determined if one or more of the temperature criteria are met. If, for example, none of the temperature thresholds are exceeded, the method 800 ends. It will be appreciated that thermal oxidation of the CC composite of the brake discs 202 is a process that is most significant at high temperatures. A comparison of the temperature profile with the set of temperature thresholds therefore identifies high temperature events corresponding to braking events that may result in thermal oxidation. As mentioned above, a braking event is, for example, an application of the brake assembly 200. However, a high temperature event is an event during which the temperature of the brake assembly exceeds at least one of the temperature thresholds as a result of a braking event. For example, if during a braking event (i.e. a braking application) the temperature of the brake assembly 200 remains below all temperature thresholds, then no high temperature events occurred during that braking event. On the other hand, if during a braking event the temperature of the brake assembly exceeds a temperature threshold, the part of the braking event for which that temperature threshold is exceeded may be referred to as a high temperature event. If more than one temperature threshold is exceeded, a high temperature event may be the part of the braking event for which the highest temperature threshold is exceeded.

The temperature thresholds may be set based on temperatures above which a significant amount of thermal oxidation is expected to occur. Therefore, the method 800 ends if none of the temperature thresholds are exceeded. This is because, in this example, no braking events causing a sufficiently high temperature for thermal oxidation have occurred. In such examples, the updated thermal oxidation state after the braking event may simply be set to the initial thermal oxidation state before the braking event in question.

Figure 9:
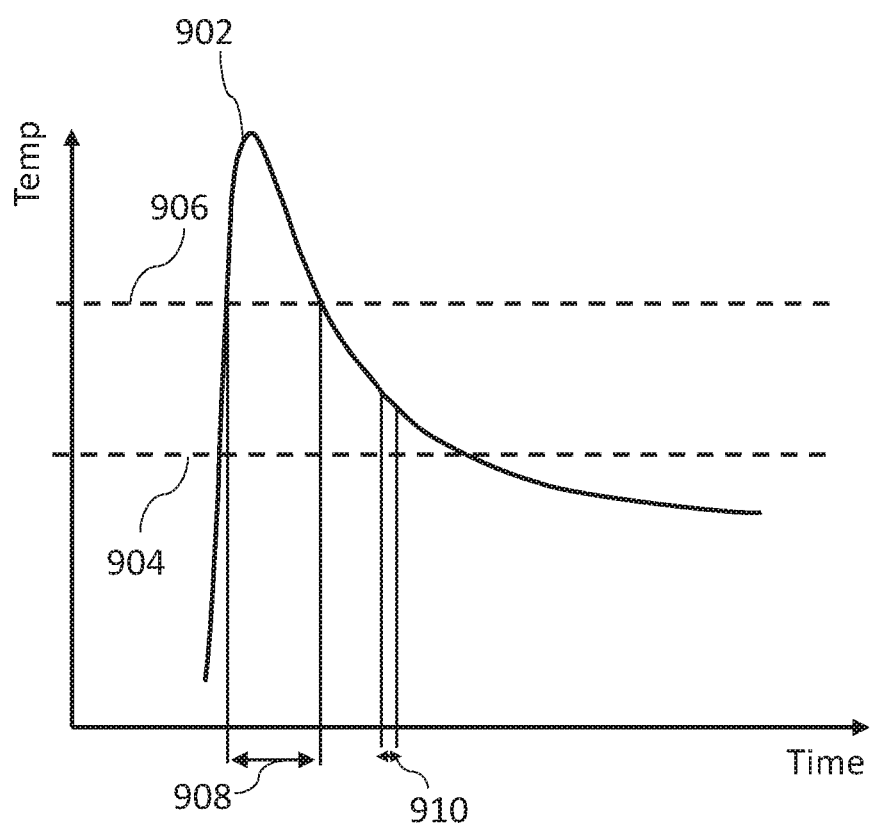
FIG. 9 is an exemplary graph illustrating the temperature of a brake with respect to time.

On the other hand, if at least one of the temperature thresholds is exceeded, at block 808 of the method 800, a high temperature event corresponding to the braking event in question is identified. A high temperature event corresponds to the part of the temperature profile which is above the highest of the exceeded temperature thresholds. This is because the part of the temperature profile which is above the highest of the exceeded thresholds corresponds to the part of the braking event for which the highest temperature threshold is exceeded. The identification of a high temperature event is described with reference to FIG. 9. FIG. 9 is a graph illustrating a part of an example temperature profile. In the graph of FIG. 9, the vertical axis represents temperature of the brake assembly 200, and the horizontal axis represents time. In this example, profile part 902 indicates that the temperature of the brake assembly 200 exceeds a first temperature threshold 904 and a second temperature threshold 906. In this example, the high temperature event is identified as the part of the profile 902 above the second temperature threshold 906 as the second temperature threshold 906 is the highest temperature threshold which is exceeded.

The amount of thermal oxidation which occurs above the second temperature threshold 906 may be significantly greater for a given interval of time compared to the thermal oxidation above the first temperature threshold 904 but below the second temperature threshold 906. Therefore, in this example, the parts of the temperature profile below the second temperature threshold 906 are not taken into account. In other examples, for example when the method 800 is used for live oxidation state monitoring as described further below, the parts of the temperature profile between the two temperature thresholds may be taken into account. It should be appreciated that the graph of FIG. 9 is merely an illustration of an example for explanatory purposes.

At block 810, the interval of time taken by the high temperature event is determined to be the high temperature interval. As mentioned above, the updated thermal oxidation state may be determined based on (among other factors) the high temperature interval. In the example of FIG. 9, the high temperature interval is determined to be the time interval 908.

At block 812, a high temperature event value of the brake assembly 200 is determined for the high temperature interval. The high temperature event value is a value of temperature ascribed to the high temperature event. In some examples, the high temperature event value is the average temperature during the high temperature interval. Alternatives to the high temperature event value being the average temperature are described below in the context of live oxidation monitoring.

At block 814, an oxidation rate parameter is calculated based on the high temperature event value and physical characteristic information of the brake. For example, the oxidation rate parameter for the thermal oxidation reaction may be determined based on the Arrhenius equation shown as Equation 3 below:

$$k(T) = A e^{-E_A/RT} \quad (3)$$

In Equation 3, k(T) is the thermal oxidation rate, A is a pre-exponential constant, $E_A$ is the activation energy of the carbon atoms of the CC composite components of brake assembly 200, R is the universal gas constant and T is the temperature. In this example, for a particular high temperature event, the temperature T in Equation 3 is set to the high temperature event value for the purpose of block 814. In this example, the thermal oxidation rate k(T) is the oxidation parameter determined at block 814. The values of activation energy $E_A$, and the pre-exponential constant A may depend on the physical properties of the CC composite components of brake assembly 200 (in this example, the brake discs 202). For example, the values of these parameters may depend on the density, porosity, manufacturing process, contaminants present in the CC composite structures, the surface finish of the components and surface coatings of the brake assembly 200. The values of the activation energy $E_A$, and the pre-exponential constant A may also vary depending on the high temperature event value and the initial thermal oxidation state. Therefore, in order to determine the oxidation parameter, appropriate values of activation energy $E_A$, and the pre-exponential constant A may be selected based on the physical properties of the brake assembly 200, the high temperature event value and the initial thermal oxidation state before the braking event in question.

For example, the activation energy $E_A$ may be related inversely to temperature. The activation energy $E_A$ may become lower at a temperature at which oxygen molecules are able to penetrate past the surface of the brake discs 202 and oxidation of carbon deeper in the brake discs 202 can take place. The appropriate values of activation energy $E_A$, and the pre-exponential constant A may, for example, be determined experimentally for different initial thermal oxidation amounts, temperatures and physical properties of the brake being considered before the method 800 is implemented.

Figure 10:
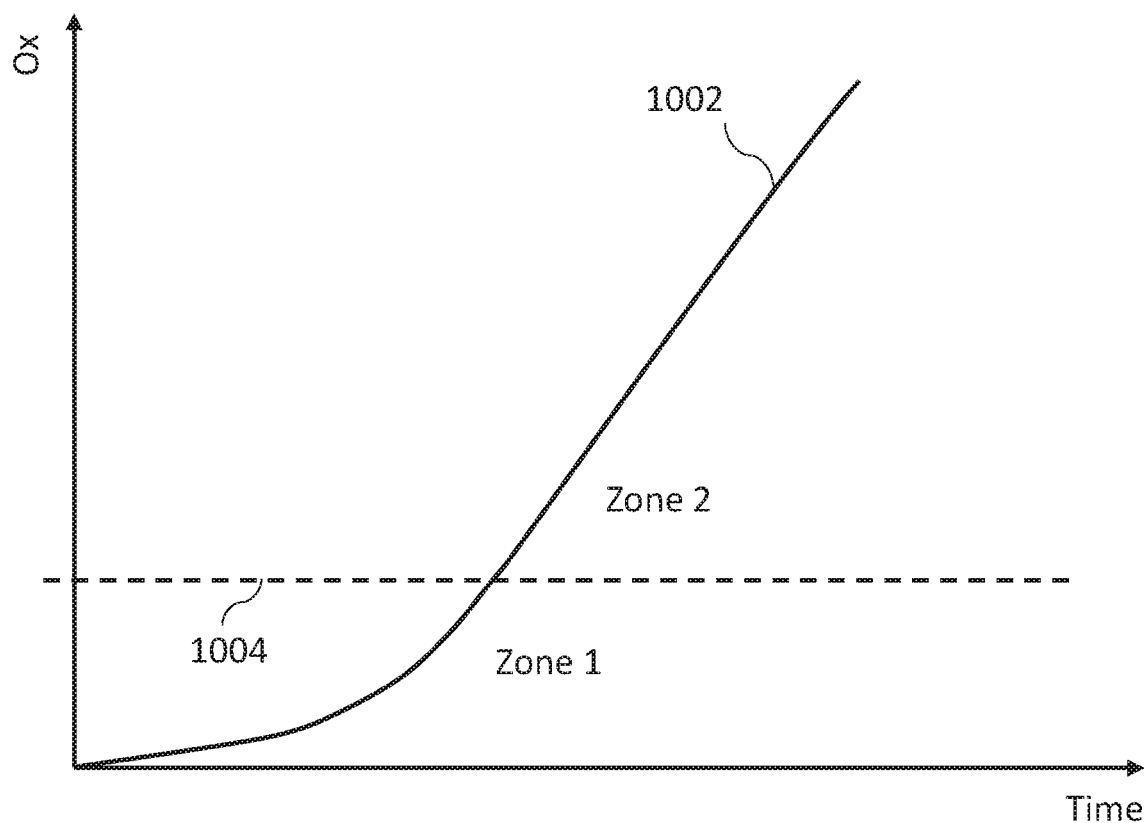
FIG. 10 is an exemplary graph illustrating the thermal oxidation state of a brake with respect to time for a specific temperature.

FIG. 10 is a graph of an example of the evolution with time of thermal oxidation of the brake discs of a brake assembly 200 for a specific temperature. The vertical axis of the graph in FIG. 10 represents a measure of the thermal oxidation indicated by the thermal oxidation state Ox. For example, the thermal oxidation state Ox may be the proportion of mass of the brake assembly 200 lost due to thermal oxidation of the brake discs 202. The evolution curve 1002 shows how the proportion of mass lost due to thermal oxidation advances with time at the specific temperature. It should be noted that a different evolution curve would indicate the variation of the thermal oxidation state Ox over time for a different temperature value.

In this example, the thermal oxidation state Ox advances with time differently below a thermal oxidation state level 1004, than it does above the thermal oxidation state level 1004. The thermal oxidation state Ox (i.e. mass lost due to thermal oxidation) is shown to increase non-linearly with time below oxidation state level 1004 and substantially linearly with time above oxidation state level 1004, in this example. In this example, the thermal oxidation state increases at an accelerated rate with time until thermal oxidation state level 1004 is reached. After thermal oxidation state level 1004 is reached, the rate of change of thermal oxidation state Ox with time remains generally constant. The part of the graph of FIG. 10 below thermal oxidation state level 1004 may be considered as a first thermal oxidation zone, namely Zone 1, and the part of the graph of FIG. 10 above thermal oxidation state level 1004 may be considered as a second thermal oxidation zone, namely Zone 2, for example.

In some examples, different values of the activation energy $E_A$, and the pre-exponential constant A may be used depending on which thermal oxidation zone the brake assembly 200 is in as indicated by the initial thermal oxidation state.

At block 816, a thermal oxidation model is selected based on the initial thermal oxidation state before the braking event. The thermal oxidation model describes the evolution of the thermal oxidation state Ox of the brake assembly 200 for different values of temperature. A thermal oxidation model which describes the evolution of the thermal oxidation state Ox in Zone 1 may be selected when the initial thermal oxidation state is in Zone 1. A thermal oxidation model which describes the evolution of the thermal oxidation state Ox in Zone 2 may be selected when the initial thermal oxidation state is in Zone 2. For example, a first thermal oxidation model, Model 1, may be selected for Zone 1, and a second thermal oxidation model, Model 2, may be selected for Zone 2. Model 1 for Zone 1, describing the non-linear change of thermal oxidation state Ox with time, may be represented by Equation 4. Model 2 for Zone 2, describing the linear change of thermal oxidation state Ox with time, may be represented by Equation 5 below.

$$Ox = 1 - [1 - \{k(T) \times t_{eq}(1-n)\}^{1/1-n}] \quad (4)$$

$$Ox = k(T) \times t_{eq} \quad (5)$$

In Equation 4 and Equation 5 above, k(T) is the thermal oxidation rate as defined by Equation 3. The parameter $t_{eq}$ is the equivalent time, which is the time it would take, at temperature T, to reach the thermal oxidation state Ox. The parameter n is referred to as the equation order and depends on the properties of the CC composite used in the brake assembly 200. The parameter n may, for example be experimentally determined for a brake using a particular CC composite.

In some examples, different thermal oxidation models to those described by Equations 4 and 5 may be used. In some examples, a single thermal oxidation model may be used which describes the evolution of the thermal oxidation state Ox for all thermal oxidation states Ox that are relevant to the brake assembly 200. In some examples, more than two thermal oxidation models may be used for respective ranges of thermal oxidation states Ox. The method 800 may be modified appropriately in order to use such alternative thermal oxidation models. For example, a different set of inputs may be applied to the thermal oxidation model, as appropriate, than are described in this specific example of the method 800.

It will be understood that block 816 may be performed at any stage of the method 800 once block 802 has been performed, because block 816 requires the initial thermal oxidation state.

At block 818, the updated thermal oxidation state for the high temperature event is determined using the selected thermal oxidation model based on the high temperature interval, the initial thermal oxidation state and the determined thermal oxidation rate parameter. For example, the time it would take to reach the initial thermal oxidation state from zero at the high temperature value is determined and the high temperature interval is added to this time in order to determine the value of $t_{eq}$ to be used in the selected thermal oxidation model. Inputting the thus determined value of $t_{eq}$, as well as the thermal oxidation parameter into the equation selected from Equations 4 and 5 above results in, as an output, the updated thermal oxidation state of the brake assembly 200 after the high temperature event.

The updated thermal oxidation state may be set to the new initial thermal oxidation state for a subsequent use of the method 800 for a subsequent high temperature event in the temperature profile.

In some examples, the method 700 and/or 800 may be performed live during a use cycle when braking events are taking place. In such examples, part of the method 800, for example, may be modified to allow live brake oxidation monitoring, and the temperature profile may correspond to temperature values being measured live. For example, temperature information which the temperature sensor 216 provides may continuously be compared to the set of temperature criteria as per block 804 of method 800, and high temperature events may be identified substantially as they occur. It will be understood that even though this kind of oxidation state monitoring is described as live, the extent to which it occurs in real time will depend on various hardware and software (e.g. processing speed) limitations. For example, there may be a time delay between temperature values corresponding to a high temperature event being measured by the temperature sensor 216, and those values resulting ultimately in updated thermal oxidation states of the brake assembly 200.

For example, high temperature events may be identified as smaller parts of the temperature profile than in the example described above. Referring again to FIG. 9, the part of the profile part 902 occurring within the time interval indicated as 910 may be taken to be a high temperature event and the interval 910 as its high temperature interval. In this example, the high temperature event value may be taken to be the temperature measured at the beginning or the end of the high temperature interval 910, for example, or the average of the two temperature values. Unlike the above example, in the case of live monitoring, parts of the temperature profile between the first and second temperature thresholds may be taken into account even when the temperature exceeds the second temperature threshold 906. In the case of live monitoring, any part of the temperature profile above at least one temperature threshold, such as the part identified by interval 910, may be identified as a high temperature event. It will be understood that such modifications may allow the thermal oxidation state of the brake assembly 200 to be updated as high temperature events corresponding to braking events are taking place. In some examples, high temperature events may be identified based on the time between subsequent temperature measurements taken by the temperature sensor 216. For example, the interval 910 may be the interval of time between subsequent temperature measurements taken by the temperature sensor 216.

The methods 700 and 800 may be used in order to determine the thermal oxidation state of the brake assembly 200 after an actual use cycle of the aircraft 100 or in a live manner during an actual use cycle. In such examples, this may be done based on one or more temperature profiles encompassing braking events within that use cycle. As mentioned above, in some examples, the thermal oxidation state of the brake assembly 200 is determined in respect of a use cycle which has actually occurred using temperature profile information collected by the temperature sensor 216.

On the other hand, in some examples, the method 700 or 800 may be used to predict a future thermal oxidation state of the brake assembly 200 after a first plurality of predicted future use cycles of the aircraft 100. The first plurality of future use cycles may be a number of cycles after which a thermal oxidation threshold is reached. Each predicted future use cycle may include a respective plurality of braking events. For each predicted future use cycle, the predictions may be based on a respective predicted temperature profile of the brake assembly 200 and a current thermal oxidation The current thermal oxidation state is, for example, the oxidation state taking into account all the previous braking events experienced by the brake assembly 200.

For example, the predicted temperature profiles may be input into the method 700 or 800, for example in time order, to determine the future thermal oxidation state of brake assembly 200. The predicted temperature profile of a predicted future use cycle may be predicted based on previous temperature profiles for previous actual use cycles of the aircraft 100. For example, using the parts of previous temperature profiles relating to the landing phase, landing phase parts of the temperature profile for a future use cycle may be predicted. For the purpose of predicting a future thermal oxidation state, high temperature intervals, high temperature event values, etc. may be stored in a computer readable storage medium when the method 700 or 800 is being carried out for actual use cycles of aircraft 100.

In some examples, data from previous cycles may not be available, for example, because brake the assembly 200 may be new. In some examples, enough data may not be available to reliably predict temperature profiles for predicted future use cycles. In such examples, predetermined temperature profiles may be used. The predetermined temperature profiles may be profiles typically expected for the future use cycle of aircraft 100.

The predicted temperature profiles may, for example, take into account the future flight schedule of the aircraft 100. For example, the aircraft 100 may be expected to land at an airport with a short runway requiring high energy (i.e. high temperature) braking upon landing for some of its predicted future use cycles. For those predicted future use cycles, the predicted temperature profiles may indicate high energy braking upon landing. It will be appreciated that various other factors may be taken into account when predicting temperature profiles such as taxiing time at various phases of a predicted future use cycle, waiting time between a taxiing phase and the preceding landing phase, and the like.

As mentioned above, the first plurality of predicted future use cycles may be a number of predicted future cycles after which the predicted future thermal oxidation state reaches a thermal oxidation threshold. For example, the prediction of the future thermal oxidation state may stop after a cycle in which the thermal oxidation threshold is reached. In some examples, the prediction of the future thermal oxidation state may stop as soon as the thermal oxidation threshold is reached. The thermal oxidation threshold may be an oxidation state at which servicing or replacement of the brake assembly 200 or a component of the brake assembly 200 is required. For example, the brake assembly 200 may require a service if its mass is reduced by between 4% and 6.5%, for instance 5.7%, where the selected percentage threshold may vary depending, for instance, on the original, manufactured disc density. In this example, the first plurality of predicted future use cycles is the number of cycles it takes for the proportion of mass lost due to thermal oxidation to reach or exceed, for instance, 5.7% (i.e. being within the range 4% to 6.5%).

On the other hand, in some examples, the prediction of the future thermal oxidation state may stop at the end of a predicted future use cycle during which the future thermal oxidation state approaches close to the thermal oxidation threshold such that the future thermal oxidation state can be expected to reach the thermal oxidation threshold during the next predicted future use cycle. In such examples, the thermal oxidation threshold may be considered reached within the first plurality of predicted future use cycles. This is because, in reality, an aircraft 100 with a brake assembly 200 expected to reach the thermal oxidation threshold in a strict sense in the very next cycle would not be permitted to fly and a service or replacement relating to the brake assembly 200 may take place at that point.

Using the first plurality of predicted future use cycles, an indication may be given as to how many use cycles can take place before the brake assembly 200 or a component of the brake assembly 200 requires servicing or replacement due to thermal oxidation. In the examples where the thermal oxidation threshold is strictly reached or exceeded during the last of the first plurality of future cycles, the number of cycles before a service or replacement is required due to thermal oxidation may be predicted as one fewer than the number of cycles in the first plurality. In examples where the prediction of the future thermal oxidation state stops when the thermal oxidation threshold is expected to be reached in the next cycle after the first plurality, the first plurality is taken as the number of cycles before a service or replacement due to thermal oxidation is required.

Figure 11:
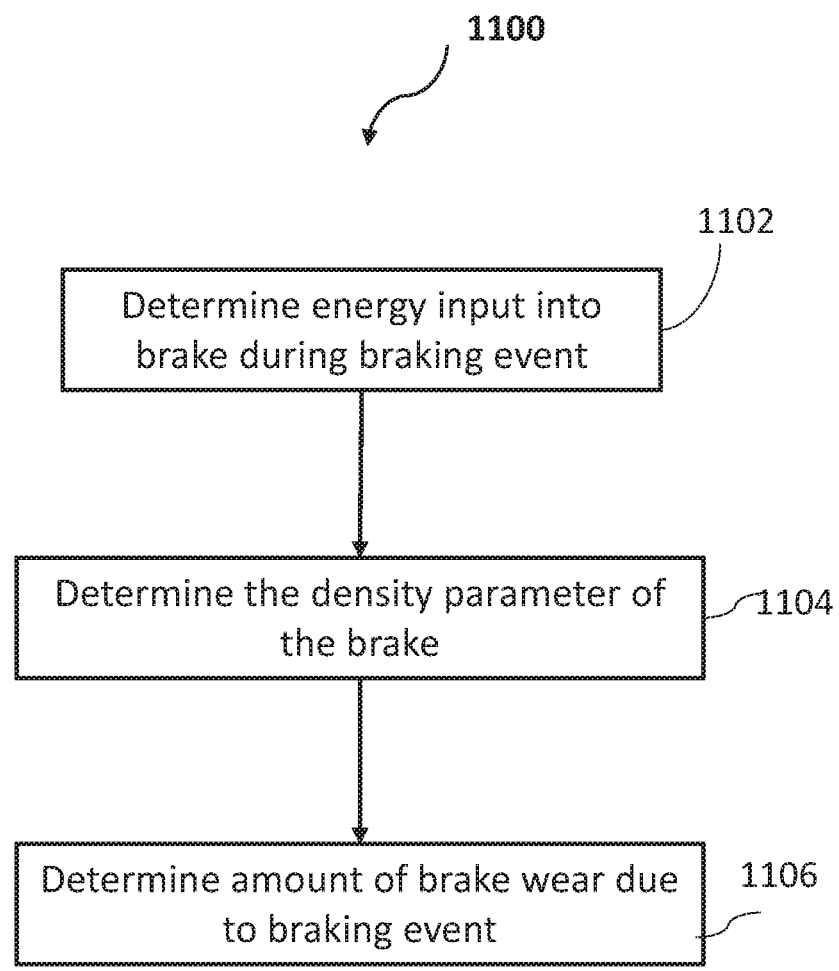
FIG. 11 is an exemplary flow diagram of a method of determining an amount of brake wear according to an example.

FIG. 11 is a flow diagram of a method 1100 of determining an amount of brake wear caused by a braking event, using a brake wear model based on an amount of energy absorbed by the brake assembly 200 due to the braking event and a density parameter of the brake assembly 200. The amount of brake wear may be determined for all braking events where energy is input into the brake assembly 200 in a process involving friction that would cause a surface of the brake discs to wear. For example, wear of the brake discs due to friction may cause the length of the brake discs 202 (length L as shown in FIG. 2) to decrease as brake disk material is lost by the action of friction.

For example, the amount of brake wear may be determined for those braking events which do not involve any high temperature events. For the method 1100, a braking event may, for example, be identified based on the temperature profile as an event where the temperature of the brake assembly 200 increases. In some examples, a braking event may simply be identified based on an indication that brake assembly 200 has been applied. For example, the computing system 106 of the aircraft 100 may detect when brake assembly 200 is applied and released.

At block 1102 of the method 1100, the energy input into the brake assembly 200 during the braking event is determined. The energy input into the brake assembly 200 may, for example, be determined based on the characteristics of the aircraft 100 during the braking event, such as a mass of the aircraft 100, the velocity of the aircraft 100 during the braking event, etc. The energy absorbed by the brake assembly 200 can be calculated based on such characteristics of the aircraft 100 by determining the kinetic energy of the aircraft 100. For example, a given proportion of the kinetic energy of the aircraft 100 may be absorbed by the brake assembly 200 to reduce the kinetic energy of the aircraft 100. In some examples, the energy input into the brake assembly 200 may be determined based on measurements acquired by the instruments 108 of the aircraft 100. For example, the instruments 108 may include a tachometer associated with the wheel 104 to which the brake assembly 200 is associated. In such examples, the tachometer measures the rotational speed of the wheel 104, and the energy absorbed by the brake assembly 200 can be determined using the change of the rotational speed with respect to time.

In other examples, if the mass of the brake assembly 200 is known, the energy absorbed may be determined based on the increase in temperature of the brake assembly 200 taking into account the specific heat of the brake assembly 200. In some examples, the mass of the brake assembly 200 may be determined based on the thermal oxidation state of the brake assembly 200 determined according to the above described methods, because, as described above, the thermal oxidation state may be expressed as an amount of mass lost from brake assembly 200 due to thermal oxidation.

At block 1104 of the method 1100, a density parameter of the brake assembly 200 is determined. The density parameter, for example, is a parameter indicating the decrease in density of the brake assembly 200 compared with the original density, taking into account lost mass. The density of the brake assembly 200 may decrease, for example, due to thermal oxidation. It will be understood that thermal oxidation causes a reduction in mass because carbon atoms react with oxygen to form carbon dioxide or carbon monoxide and are thus removed from brake discs 202. However, thermal oxidation may not necessarily change the volume of the brake discs 202. This is because thermal oxidation may not act uniformly on a particular surface of a brake disc and may take place up to a certain depth inside the brake disc.

The density parameter may be expressed as $(1-Ox)$ where the thermal oxidation state Ox is expressed as a number between zero and one. For example, the density of the brake assembly 200 is reduced by a factor $(1-Ox)$ compared to the initial density before any thermal oxidation took place (i.e. when the brake assembly 200 was new). Therefore, the density parameter may be determined based on the initial oxidation state before the braking event.

In some examples, the reduced density of the brake assembly 200 may be determined based on measurements by instruments included in the instruments 108. For example, the mass of the brake assembly 200 may be calculated based on an amount of energy absorbed by the brake assembly 200 (based on measurements from a tachometer, for example) and the consequent increase in its temperature (based on measurements from temperature sensor 216, for example). The reduced density of the brake assembly 200 may be determined based on the calculated mass of the brake assembly 200. The aircraft 100 may include a wear pin associated with brake assembly 200. Typically, a wear pin provides an indication of the reduction in length L of a brake and therefore an indication of the brake wear. The wear pin may be checked between cycles by ground crew, for example, and an updated volume value of the brake assembly 200 acquired. In some examples, there may be other ways to measure the change in length L of the brake assembly 200. For example, a length sensor may be provided for the brake assembly 200, and/or electrically actuated brakes may be used. An updated volume value may be determined, based on reduced length L, and used to determine the reduced density from the mass. During a single cycle, the change in volume of brake assembly 200 may be insignificant for the purpose of calculating the density parameter, and an updated volume may be acquired after a number of cycles. From the reduced density, the density parameter may be determined.

At block 1106 of the method 1100, an amount of brake wear caused by the braking event is determined, using a brake wear model based on the energy absorbed by the brake assembly 200 and the density parameter from block 1104. For example, the mass of the brake assembly 200 lost due to wear during the wear event is determined using the brake wear model of Equation 6 below.

$$m_{wear} = \frac{W + X \times E_{brake} + Y \times E_{brake}^2 + Z \times E_{brake}^3}{(1 - Ox)} \quad (6)$$

In Equation 6 above, $m_{wear}$ is the mass lost due to wear during the braking event, $E_{brake}$ is the energy absorbed by the brake assembly 200, and W, X, Y and Z are constants. The constants W, X, Y and Z may, for example, be determined by experiment beforehand, and may vary depending on the properties of the brake assembly 200. The brake wear amount for a braking event may be determined as a reduction in length L of the brake assembly 200 based on the reduction of mass due to brake wear during that braking event.

As mentioned above, the initial thermal oxidation rate is used to determine the density parameter in some examples. In these examples, when a braking event takes place during which a high temperature event also occurs, the initial thermal oxidation state may be used for the determination of block 1106. This is because brake wear occurs on a much shorter timescale than thermal oxidation.

The amount of brake wear determined for a braking event may be added to the amount of brake wear from all previous braking events of the brake assembly 200 in order to determine the total brake wear amount.

The method 1100 may, for example, be performed live during a time when braking events are taking place, or for a use cycle which has already occurred using the relevant data from that use cycle. The method 1100 may also be used in order to predict a future brake wear amount for the brake assembly 200 after a second plurality of predicted future use cycles of the aircraft 100. The second plurality of predicted future use cycles may be a number of cycles after which a brake wear threshold is reached. Each predicted future use cycle may include a respective plurality of braking events. For example, the method 1100 may be performed for each braking event in the second plurality of predicted future use cycles. The wear amount from each of those braking events may be added up to predict the future brake wear amount for the second plurality of predicted future use cycles. For each predicted future use cycle, the predictions may be based on predicted amounts of energy absorbed by the brake during respective braking events, and respective predicted density parameters of the brake for respective braking events. For example, braking events may be identified and energy absorbed by brake assembly 200 for those braking events determined based on the predicted temperature profiles. In other examples, predicted amounts of absorbed energy may be based on data from previous cycles. If the brake assembly 200 is new, or enough previous data is not available, the predicted amounts of energy may be predetermined.

For the purpose of predicting the future brake wear amount, the method 1100 may be used in combination with the method 700 or 800. In these examples, the up to date initial thermal oxidation state just before each predicted braking event (e.g. a predicted future braking event) is known. In this way, the mass of the brake assembly 200, and therefore the density parameter, may be determined using the initial thermal oxidation before the future braking event in question.

As mentioned above, the second plurality of predicted future use cycles may be a number of predicted future cycles after which the predicted future brake wear amount reaches a brake wear threshold. For example, the prediction of the future brake wear amount may stop after a cycle in which the brake wear threshold is reached. In some examples, the prediction of the future brake wear amount may stop as soon as the total brake wear amount reaches the brake wear threshold. The brake wear threshold may be a total amount of brake wear at which servicing or replacement of the brake assembly 200 or a component of the brake assembly 200 is required. For example, a brake assembly such as the brake assembly 200 of FIG. 2 may require a service if its length L has been reduced by, say, 22% to 24%, depending, for example, on the kind of discs and original, manufactured density thereof. For an exemplary disk having an original length L of around 221 mm, a reduction in length of around 50 mm may trigger servicing or replacement. In this example, the second plurality of predicted future use cycles is the number of cycles it takes for the total brake wear amount to reach or exceed, for instance 50 mm (again, for an original disc having a length L of around 221 mm).

On the other hand, in some examples, the prediction of the future brake wear amount may stop at the end of a predicted future use cycle during which the total brake wear amount approaches close to the brake wear threshold such that the total brake wear amount can be expected to reach the brake wear threshold during the next predicted future use cycle. In such examples, the brake wear threshold may be considered reached within the second plurality of predicted future use cycles. This is because, in reality, an aircraft 100 with the brake assembly 200 expected to reach the brake wear threshold in a strict sense in the very next cycle would not be permitted to fly and a service or replacement relating to the brake assembly 200 may take place at that point.

Using the second plurality of predicted future use cycles, an indication may be given as to how many use cycles can take place before the brake assembly 200 or a component of the brake assembly 200 requires servicing or replacement due to brake wear. In the examples where the brake wear threshold is strictly reached or exceeded during the last of the second plurality of future cycles, the number of cycles before a service or replacement is required due to brake wear may be predicted as one less than the number of cycles in the second plurality. In examples where the prediction of the future brake wear amount stops when the brake wear threshold is expected to be reached in the next cycle after the second plurality, the second plurality is taken as the number of cycles before a service or replacement due to brake wear is required.

Figure 12:
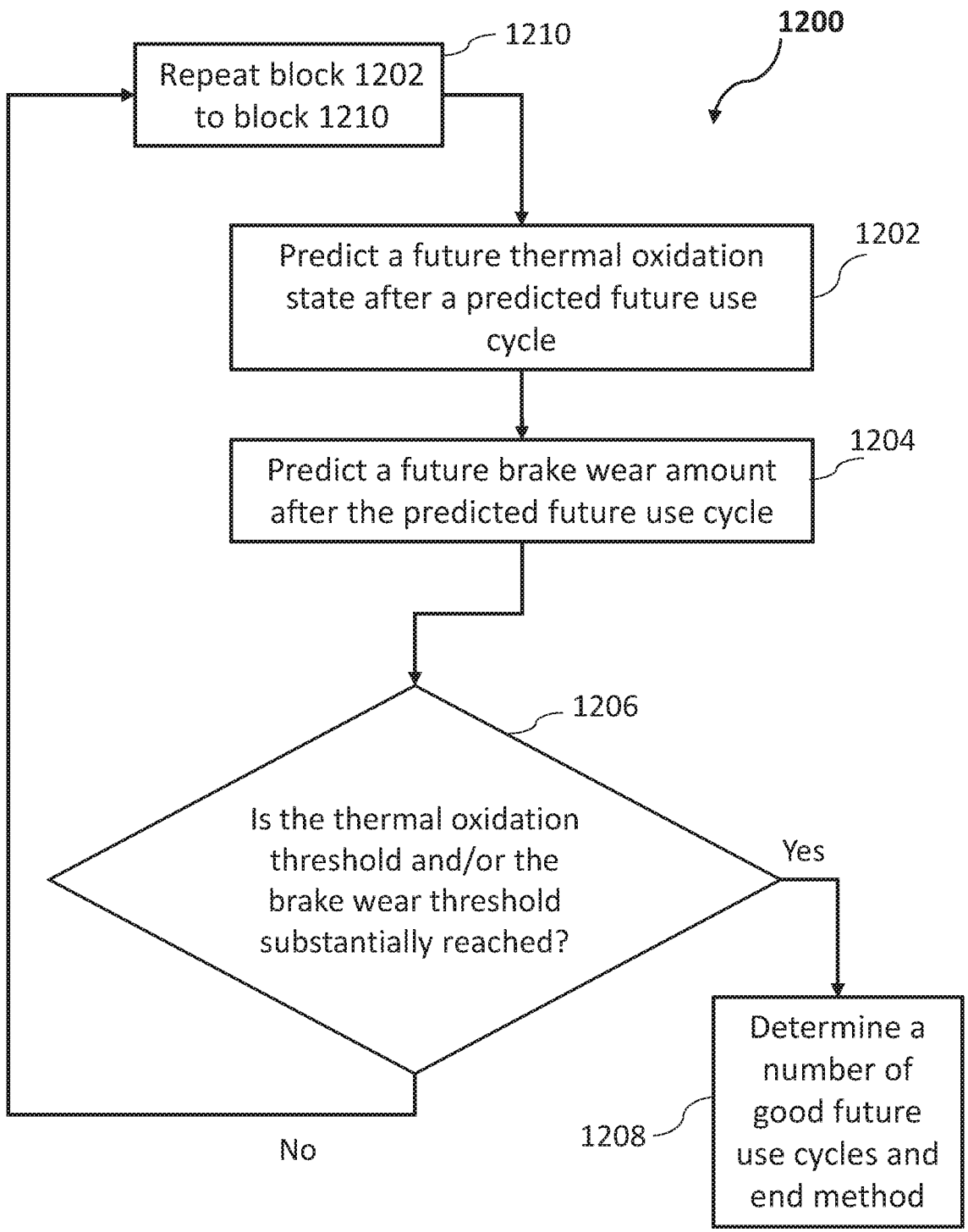
FIG. 12 is an exemplary flow diagram of a method of predicting a number of good future use cycles with respect to an aircraft brake according to an example.

FIG. 12 is a flow diagram of a method 1200 for determining a number of good future use cycles until one of the thermal oxidation threshold and the brake wear threshold is reached. The number of good future use cycles is the remaining number of future use cycles before one of the thermal oxidation threshold or the brake wear threshold is reached. The method 1200 may be performed for a number of predicted future use cycles until the first of the thresholds is reached. The method 1200 involves predicting a future thermal oxidation state and a future brake wear amount after a predicted future use cycle and, if one of the thermal oxidation threshold and the brake wear threshold is reached, determining a number of good future use cycles before either of the thresholds is reached. If one of the thresholds is not reached, the predictions are performed for the next predicted future use cycle. As in the above examples, each predicted future use cycle includes a plurality of braking event. For each predicted future use cycle the predictions are based on a respective predicted temperature profile of the brake, a current thermal oxidation state, predicted amounts of energy absorbed by the brake during respective braking events, and respective predicted density parameters of the brake for respective braking events.

The number of good future use cycles is a number of cycles after which servicing or replacement of the brake assembly 200 or a component of the brake assembly 200 is required. It will be appreciated that service or replacement in relation to the brake assembly 200 may be carried out when one of the thermal oxidation threshold or the brake wear threshold is first reached. Which threshold is reached first may, for example, depend on the way the aircraft 100 is handled during use and its flight schedule. For example, if the aircraft 100's schedule involves flying to mostly airports with long runways, short taxiing routes, etc., the brake wear threshold may be reached first. This is because, in such examples, the temperature of the brake assembly 200 may not often exceed any of the temperature thresholds relating to thermal oxidation. On the other hand, the aircraft 100 may often experience high energy braking (e.g. due to short runways) causing temperatures above the thresholds related to thermal oxidation. In such examples the thermal oxidation threshold may be reached first.

At block 1202 of the method 1200, a future thermal oxidation state after a predicted future use cycle is predicted. The prediction of the future thermal oxidation state is performed as described above, for example, using an appropriate thermal oxidation model based on a predicted temperature profile of the predicted future use cycle in question. At block 1204 of the method 1200, a future brake wear amount after the same predicted future use cycle is predicted. The prediction is performed as described above in the context of method 1100.

At block 1206 of the method 1200, it is determined whether the thermal oxidation threshold and/or the brake wear threshold is reached. For example, if the thermal oxidation threshold is reached, the method 1200 proceeds to block 1208 at which a number of good future use cycles, before either of the thermal oxidation threshold or the brake wear threshold is reached, is determined, and the method 1200 ends. For example, if the thermal oxidation threshold is strictly reached or exceeded after a given number of predicted future use cycles, the number of good future use cycles is one less than that given number. For example, if the thermal oxidation threshold is expected to be reached in the very next predicted future use cycle, the number of good future use cycles is determined as the number of predicted future use cycles for which the method 1200 has been performed thus far.

On the other hand, if it is determined that the brake wear threshold is reached, the method proceeds to block 1208 where a number of good future use cycles is determined, and the method 1200 ends. For example, if the brake wear threshold is strictly reached or exceeded after a given number of predicted future use cycles, the number of good future use cycles is one less than that given number. For example, if the brake wear threshold is expected to be reached in the very next predicted future use cycle, the number of good future use cycles is determined as the number of predicted future use cycles for which method 1200 has been performed thus far.

If, for example, both the thresholds are reached, the method 1200 proceeds to block 1208 where a number of remaining good future use cycles, before either the thermal oxidation threshold or the brake wear threshold is reached, is determined and the method 1200 ends. In this example, if at least one of the thresholds is strictly reached or exceeded after a given number of predicted future use cycles, the number of good future use cycles is one less than that given number. Otherwise, the number of good future use cycles is determined as the number of predicted future use cycles for which the method 1200 has been performed thus far.

If the brake wear threshold is not reached, the method 1200 proceeds to block 1210 and blocks 1202 to 1210 are repeated for the next predicted future use cycle.

In this way, a number of good future use cycles may be predicted based on which of the thermal oxidation threshold and the brake wear threshold is reached first. This is because, the brake assembly 200 may require a service or replacement, or a component of the brake assembly 200 may require a service or replacement once the first of these thresholds is reached. It will be appreciated, for example, that brake assembly 200 will not continue to be used if the thermal oxidation threshold is reached but the brake wear threshold is not. It should also be appreciated that blocks of the method 1200 may be performed in any suitable order. For example block 1204 may be performed before block 1202 and/or block 1210 may be performed before block 1206.

One or more of the above described methods, namely the methods 700, 800, 1100 and 1200, or any of their variations (e.g. live determination of oxidation or brake wear, or prediction of future thermal oxidation state or future brake wear, etc.) may be performed by a processor of the computing system 106 of the aircraft 100, for example, based on instructions stored in a computer readable storage medium of the computing system 106. For example, monitoring of the thermal oxidation state (subsequent to use cycles or live) may be performed by a processor of computing system 106. Alternatively, or in addition, monitoring of the brake wear (subsequent to use cycles or live) may be performed by a processor of the computing system. Alternatively, or in addition to any of these examples, predictions relating to the future thermal oxidation state and/or the future brake wear state may be performed by a processor of the computing system 106. The methods may be performed, for example, using data from the instruments 108. For example, temperature data as measured by the temperature sensor 216 may be used. In the case of prediction, the future temperature profiles and/or other predicted data may be predicted by a processor of the computing system 106. Alternatively, the data for prediction may be determined on a computing system not on board the aircraft 100, and may be stored in a computer readable storage medium of the computing system 106.

All or part of the instructions for performing the above described processes may be generated and/or the processes may be performed using any suitable software or combination of software. In one example, "MATLAB" and/or "SCADE" may be used to generate all or part of the instructions for respective processors to carry out any of the above processes. In other examples, other software packages may be used. For example, any suitable programming language, development environment, software package, or the like may be used. Other examples of programming languages include PYTHON, C++, C, JAVASCRIPT, FORTRAN etc.

It is to be noted that the term "or" as used herein is to be interpreted to mean "and/or", unless expressly stated otherwise. Although the invention has been described above with reference to one or more preferred examples, it will be appreciated that various changes or modifications may be made without departing from the scope of the invention as defined in the appended claims.

The invention claimed is:

1. An aircraft apparatus for an aircraft having one or more carbon aircraft wheel brakes, and a brake wear sensor configured to measure a wear value of a brake of the one or more carbon aircraft wheel brakes, the apparatus comprising a processor configured to:
   determine a number of future use cycles of the brake based on a predicted condition of the brake, wherein the predicted condition of the brake comprises a predicted brake length value,
      the predicted brake length value being determined based on the wear value of the brake measured by the wear sensor and a hypothetical oxidation length of the brake,
      the hypothetical thermal oxidation length being determined based on an amount of mass lost from the brake as indicated by a thermal oxidation state of the brake, an area of a brake disc of the brake, and an original density of the brake;
   provide an indication of the determined number of the future use cycles to ground crew and/or a pilot of the aircraft,
   wherein the number of future use cycles is the number of use cycles for which the brake is allowed to be used, and a use cycle comprises all uses of the brake relating to a flight undertaken by the aircraft from departure to arrival; and
   the predicted brake length is less than a brake length determined from the measured wear value.

2. The apparatus according to claim 1, wherein the predicted condition is a predicted future condition of the brake.

3. The apparatus according to claim 1, wherein:
   the predicted condition further comprises a predicted thermal oxidation state of the brake.

4. The apparatus according to claim 3, wherein the processor is configured to:
   determine the number of future use cycles by predicting the number of future use cycles required for the predicted thermal oxidation state to reach an thermal oxidation threshold.

5. The apparatus according to claim 1, wherein the processor is configured to:
   determine the number of future use cycles by predicting the number of future use cycles required for a predicted wear value to reach a wear threshold.

6. The apparatus according to claim 1, wherein the processor is configured to: determine a wear relationship based on one or more measured wear values.

7. The apparatus according to claim 1, wherein the processor is configured to:
   determine the predicted brake length value by subtracting the hypothetical thermal oxidation length from the wear value.

8. The apparatus according to claim 1, wherein the processor is configured to:
   determine the number of future use cycles by predicting the number of future use cycles required for the predicted brake length value to reach a brake length threshold.

9. The apparatus according to claim 8, wherein the processor is configured to:
   determine a brake length relationship between a brake length value and a number of use cycles of the brake; and
   determine the predicted brake length value based on the brake length relationship.

10. The apparatus according to claim 1, wherein the processor is configured to:
    compare the predicted condition of the brake to a condition of the brake determined based on one or more measured characteristics of the brake.

11. The apparatus according to claim 10, wherein the processor is configured to:
    determine whether or not a brake warning criterion is satisfied based on the comparison; and
    provide an indication that the brake warning criterion is satisfied.

12. A method of determining a number of future use cycles of a brake of one or more carbon aircraft wheel brakes of an aircraft, the brake comprising a brake wear sensor configured to measure a wear value of the brake, the method comprising:
    determining a number of future use cycles of the brake based on a predicted condition of the brake, wherein the predicted condition of the brake comprises a predicted brake length value, the predicted brake length value being determined based on the wear value of the brake measured by the wear sensor and a hypothetical thermal oxidation length of the brake, the hypothetical thermal oxidation length being determined based on an amount of mass lost from the brake as indicated by a thermal oxidation state of the brake, an area of a brake disc of the brake, and an original density of the brake;
    providing an indication of the determined number of future use cycles to ground crew and/or a pilot of the aircraft;
    wherein the number of future use cycles is the number of use cycles for which the brake is allowed to be used, and a use cycle comprises all uses of the brake relating to a flight undertaken by the aircraft from departure to arrival; and
    the predicted brake length is less than a brake length determined from the measured wear value.

13. The method according to claim 12, wherein the predicted condition is a predicted future condition of the brake.

14. The method according to claim 12, wherein:
    the predicted condition further comprises a predicted thermal oxidation state of the brake.

15. The method according claim 14, comprising:
    determining the number of future use cycles by predicting the number of future use cycles required for the predicted thermal oxidation state to reach an thermal oxidation threshold.

16. The method according to claim 12, comprising:
    determining the number of future use cycles by predicting the number of future use cycles required for a predicted wear value to reach a wear threshold.

17. The method according to claim 12, comprising:
    determining a wear relationship based on one or more measured wear values.

18. The method according to claim 12, further comprising:
    determining the number of future use cycles by predicting the number of future use cycles required for the predicted brake length value to reach a brake length threshold.

19. The method according to claim 18 comprising:
    determining a brake length relationship between a brake length value and a number of use cycles of the brake; and determining the predicted brake length value based on the brake length relationship.

20. The method according to claim 12, comprising:
comparing the predicted condition of the brake to a condition of the brake determined based on one or more measured characteristics of the brake.

21. The method according to claim 20 comprising:
determining whether or not a brake warning criterion is satisfied based on the comparison; and
providing an indication that the brake warning criterion is satisfied.

* * * * *